(12) United States Patent
Shukunami et al.

(10) Patent No.: US 11,509,394 B2
(45) Date of Patent: Nov. 22, 2022

(54) CONTROLLER AND CONTROL METHOD FOR RAMAN AMPLIFIER

(71) Applicant: FUJITSU LIMITED, Kawasaki (JP)

(72) Inventors: Norifumi Shukunami, Yokohama (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/335,277

(22) Filed: Jun. 1, 2021

(65) Prior Publication Data
US 2022/0045755 A1 Feb. 10, 2022

(30) Foreign Application Priority Data
Aug. 4, 2020 (JP) .............................. JP2020-132468

(51) Int. Cl.
*H04B 10/2537* (2013.01)
*H04B 10/291* (2013.01)
*H04B 10/079* (2013.01)

(52) U.S. Cl.
CPC ... *H04B 10/2537* (2013.01); *H04B 10/07953* (2013.01); *H04B 10/2916* (2013.01)

(58) Field of Classification Search
None
See application file for complete search history.

(56) References Cited

U.S. PATENT DOCUMENTS

| | | | | |
|---|---|---|---|---|
| 6,873,455 B2* | 3/2005 | Sugaya | ............... | H01S 3/06758 359/334 |
| 2002/0041431 A1* | 4/2002 | Ohshima | ............ | H04B 10/2916 359/334 |
| 2002/0044336 A1* | 4/2002 | Tanaka | ............... | H04B 10/0731 359/334 |

(Continued)

FOREIGN PATENT DOCUMENTS

| | | |
|---|---|---|
| JP | 2001-109025 | 4/2001 |
| JP | 2004-287307 | 10/2004 |

(Continued)

OTHER PUBLICATIONS

M. Morimoto et al., "Co-Propagating Dual-Order Distributed Raman Amplifier Utilizing Incoherent Pumping", IEEE Photonics Technology Letters, vol. 29, No. 7, Apr. 1, 2017.

*Primary Examiner* — David W Lambert
(74) *Attorney, Agent, or Firm* — Staas & Halsey LLP

(57) ABSTRACT

A controller for a front-exciting Raman-amplifier that amplifies an optical signal transmitted from one end of an optical fiber to other end by inputting an excitation light to the one end, the controller includes a memory, and a processor coupled to the memory and configured to acquire communication-related information regarding communication of the optical signal in the optical fiber, when the acquired communication-related information does not indicate the communication of the optical signal, set a Raman gain of the front-exciting Raman amplifier based on a first light intensity of an amplified spontaneous scattered light of the (Continued)

excitation light, and when the acquired communication-related information indicates the communication of the optical signal, set the Raman gain based on a second light intensity of the optical signal output from the optical fiber.

8 Claims, 22 Drawing Sheets

(56) References Cited

U.S. PATENT DOCUMENTS

| | | | |
|---|---|---|---|
| 2003/0091300 A1* | 5/2003 | Irino | H01S 3/302 |
| | | | 385/88 |
| 2004/0196158 A1 | 10/2004 | Sugaya et al. | |
| 2004/0201882 A1* | 10/2004 | Kikuchi | H04B 10/2916 |
| | | | 359/341.43 |
| 2005/0024712 A1 | 2/2005 | Hiraizumi et al. | |
| 2005/0225843 A1 | 10/2005 | Sugaya et al. | |
| 2013/0314768 A1 | 11/2013 | Takeyama | |
| 2015/0365187 A1* | 12/2015 | Kondo | H04B 10/07955 |
| | | | 398/38 |

FOREIGN PATENT DOCUMENTS

| | | |
|---|---|---|
| JP | 2005-303070 | 10/2005 |
| JP | 2006-189465 | 7/2006 |
| JP | 2006-246053 | 9/2006 |
| JP | 2013-247406 | 12/2013 |

* cited by examiner

CONTROLLER AND CONTROL METHOD FOR RAMAN AMPLIFIER

CROSS-REFERENCE TO RELATED APPLICATION

This application is based upon and claims the benefit of the prior Japanese Patent Application No. 2020-132468, filed on Aug. 4, 2020, the entire contents of which are incorporated herein by reference.

FIELD

The embodiments discussed herein are related to a controller and a control method for a Raman amplifier.

BACKGROUND

In a wavelength division multiplexing (WDM) transmission system, a rare earth-added fiber amplifier (e.g., an erbium-added fiber amplifier) capable of amplifying an optical signal in a wide wavelength band, is used. There have been proposed techniques in which a Raman amplifier is additionally used for the WDM transmission system using the rare earth-added fiber amplifier (see, e.g., Japanese Laid-Open Patent Publication Nos. 2004-287307, 2006-189465, 2005-303070, 2006-246053, 2001-109025, and 2013-247406, and Non-Patent Document 1 indicated below). The Raman amplifier is an amplifier that amplifies an optical signal by an induced Raman scattering. The Raman amplifier is an optical amplifier characterized by a low noise despite its low excitation efficiency.

Raman amplifiers are classified into a rear-exciting Raman amplifier and a front-exciting Raman amplifier. The rear-exciting Raman amplifier amplifies a WDM signal by inputting excitation light in the direction opposite to the propagation direction of the WDM signal into an optical fiber (see, e.g., Japanese Laid-Open Patent Publication Nos. 2004-287307, 2006-189465, 2005-303070, 2001-109025, and 2013-247406). The front-exciting Raman amplifier amplifies a WDM signal by inputting excitation light in the same direction as the propagation direction of the WDM signal into an optical fiber (see, e.g., Japanese Laid-Open Patent Publication Nos. 2005-303070 and 2006-246053).

The main cause of deterioration of the optical signal noise ratio (OSNR) in WDM transmission systems is the amplified spontaneous emission (ASE) generated by the rare earth-added fiber amplifier. The deterioration of the OSNR due to the ASE may be improved by amplifying the WDM signal with the rear-exciting Raman amplifier before amplifying the WDM signal with the rare earth-added fiber amplifier. The WDM signal is amplified by a low-noise rear-exciting Raman amplifier and is then amplified by the large-gain rare earth-added fiber amplifier. Thereafter, the WDM signal is photo-electrically converted by an optical transceiver.

The deterioration of the OSNR due to the ASE may be further improved by the bidirectional Raman amplification (see, e.g., Japanese Laid-Open Patent Publication No. 2005-303070). The bidirectional Raman amplification is a technique for amplifying a WDM signal with a front-exciting Raman amplifier on the input side of an optical fiber, and further amplifying the WDM signal with a rear-exciting Raman amplifier on the output side of the optical fiber.

In the proposed techniques (see, e.g., Japanese Laid-Open Patent Publication Nos. 2004-287307, 2006-189465, 2005-303070, 2006-246053, 2001-109025, and 2013-247406), the gain of the Raman amplifier is controlled by various methods. However, in any proposals, the gain of the Raman amplifier is set by only one of a case when the WDM signal is communicated via a transmission fiber (i.e., the optical fiber through which the WDM signal is transmitted) a case when the WDM signal is not communicated via the transmission fiber (see, e.g., Japanese Laid-Open Patent Publication Nos. 2004-287307, 2006-189465, 2005-303070, 2006-246053, 2001-109025, and 2013-247406).

Related techniques are disclosed in, for example, Japanese Laid-Open Patent Publication Nos. 2004-287307, 2006-189465, 2005-303070, 2006-246053, 2001-109025, and 2013-247406.

Related techniques are also disclosed in, M. Morimoto, H. Ogoshi, J. Yoshida, S. Takasaka, A. Sano, and Y. Miyamoto, "Co-Propagating Dual-Order Distributed Raman Amplifier Utilizing Incoherent Pumping", IEEE PHOTONICS TECHNOLOGY LETTERS, VOL. 29, NO. 7, Apr. 1, 2017 (Non-Patent Document 1).

SUMMARY

According to an aspect of the embodiments, a controller for a front-exciting Raman amplifier that amplifies an optical signal transmitted from one end of an optical fiber to other end of the optical fiber by inputting an excitation light to the one end of the optical fiber, the controller includes a memory, and a processor coupled to the memory and configured to acquire communication-related information regarding communication of the optical signal in the optical fiber, when the acquired communication-related information does not indicate the communication of the optical signal, set a Raman gain of the front-exciting Raman amplifier based on a first light intensity of an amplified spontaneous scattered light of the excitation light, and when the acquired communication-related information indicates the communication of the optical signal, set the Raman gain based on a second light intensity of the optical signal output from the optical fiber.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
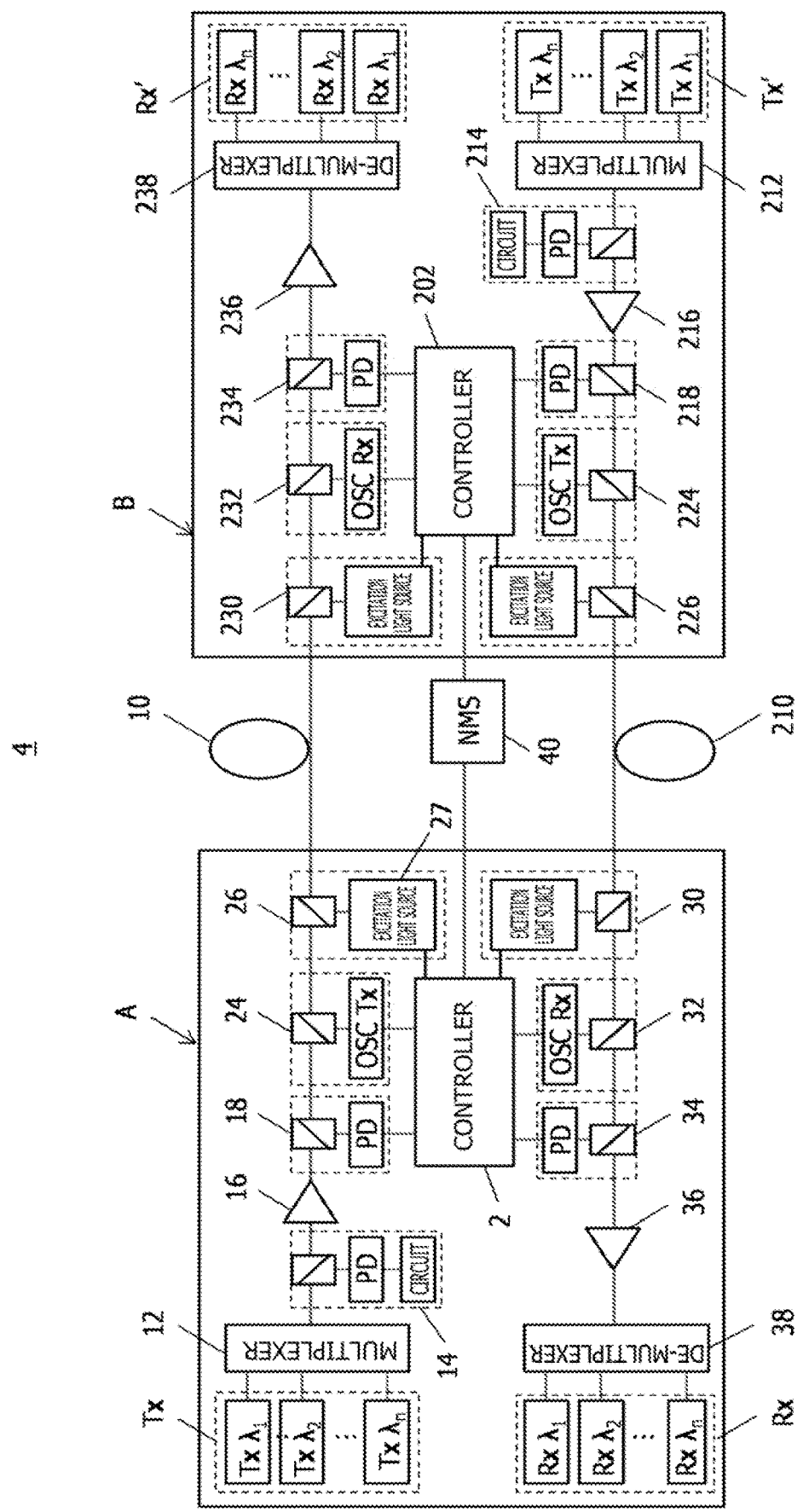
FIG. 1 is a diagram illustrating an example of a wavelength division multiplexing (WDM) transmission system 4 to which a controller 2 according to a first embodiment is applied.

The rear-exciting Raman amplifier has already been put into practical use. The gain of a Raman amplifier (i.e., the Raman gain) is approximately proportional to the light intensity of amplified spontaneous Raman scattering (ASS) of excitation light. Therefore, the gain of the rear-exciting Raman amplifier is set based on the light intensity of the ASS generated by the excitation light.

Specifically, first, the target value of the light intensity of a rear ASS (hereinafter, referred to as an ASS target value) corresponding to the target value of the Raman gain is calculated from a relational expression between the light intensity of the ASS (hereinafter, referred to as a rear ASS) scattered in the direction opposite to the excitation light and the Raman gain. The gain of the rear-exciting Raman amplifier is set by adjusting the excitation light intensity (the optical power of the excitation light) so that the actual light intensity of the rear ASS matches the calculated ASS target value.

The wavelength band of the ASS and the wavelength band of the wavelength division multiplexing (WDM) signal overlap with each other. Therefore, when the excitation light of the rear-exciting Raman amplifier is input to the transmission fiber through which the WDM signal is communicated (i.e., transmitted), since the rear ASS and the WDM signal are output together from the transmission fiber, the measurement of the light intensity of the rear ASS may be hindered. Therefore, the gain of the rear-exciting Raman amplifier is set when the WDM signal is not communicated (e.g., when the WDM transmission system is started).

The front-exciting Raman amplifier has a problem that the relative intensity noise (RIN) of an excitation light source transfers to the WDM signal, which does not appear in the rear-exciting Raman amplifier. For this reason, although the practical application of the front-exciting Raman amplifier has been delayed, the problem is being solved by improving the excitation light source (see, e.g., Non-Patent Document 1).

Therefore, it may be considered that the front-exciting Raman amplifier may be introduced in the WDM transmission system in the future. Specifically, when the next-generation optical transceiver operating at a high bit rate is additionally installed at a terminal, it may be considered that the front-exciting Raman amplifier is also installed together.

When the front-exciting Raman amplifier is introduced in the WDM transmission system, it is important that the Raman gain may be set regardless of whether the WDM signal is communicated. In other words, it is important that the gain of the front-exciting Raman amplifier may be set without stopping the WDM transmission system in operation.

However, when the WDM signal is communicated, the reflected light of the WDM signal by an optical connector or the like interferes with the measurement of the light intensity of the ASS, which makes it difficult to set the Raman gain based on the light intensity of the ASS.

Hereinafter, embodiments of a technique that enables setting of the gain of the front-exciting Raman amplifier regardless of whether an optical signal is communicated via an optical fiber that gives the Raman gain will be described with reference to the drawings. However, the technical scope of the present disclosure is not limited to the embodiments, but extends to the matters described in the claims and their equivalents. Throughout the drawings, parts and the like having the same structure are denoted by the same reference numerals, and explanation thereof will not be repeated.

First Embodiment (1) WDM Transmission System

Figure 2:
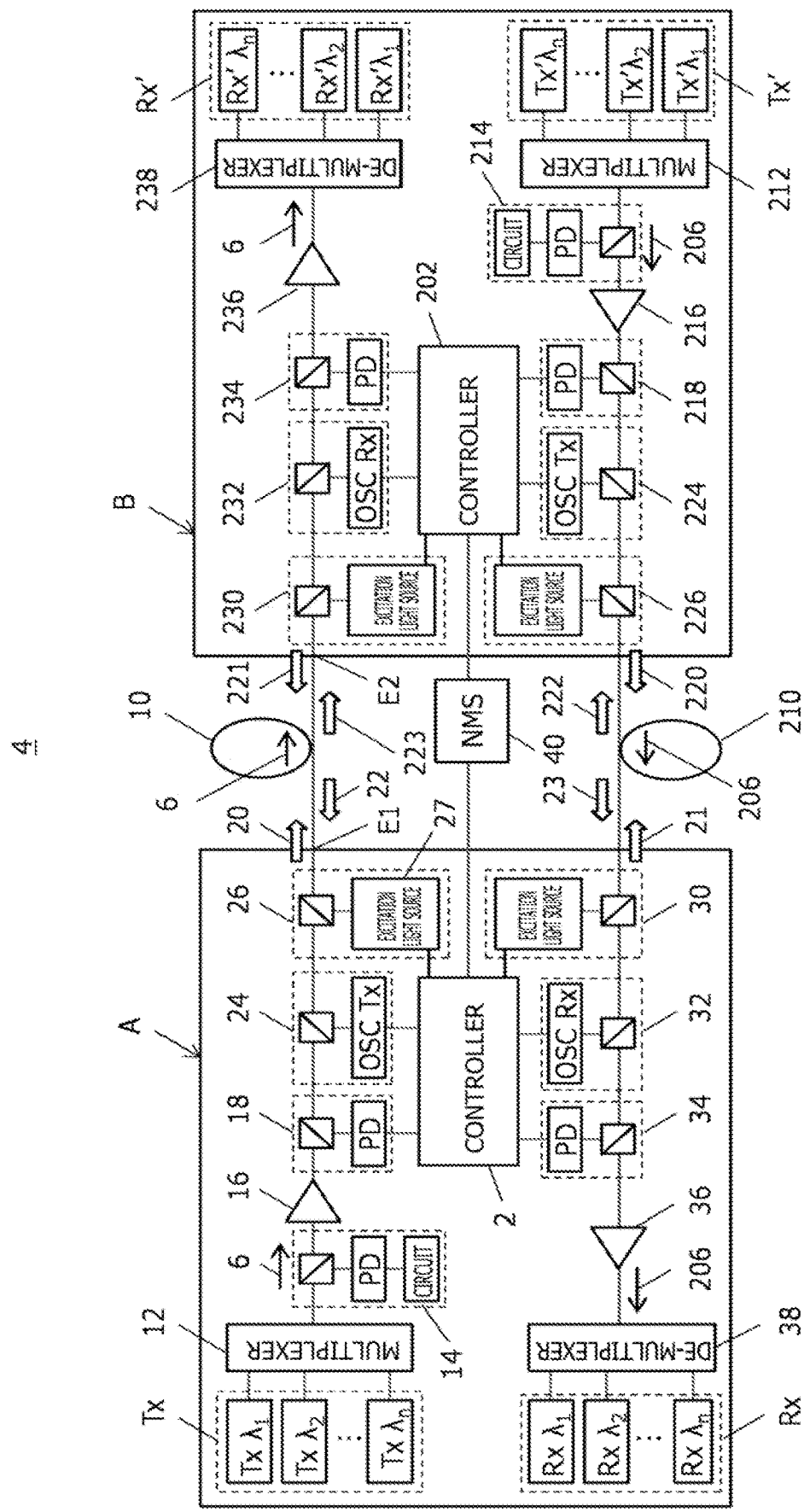
FIG. 2 is a diagram illustrating the flow of a WDM signal 6 and the like in the WDM transmission system 4.

FIG. 1 is a diagram illustrating an example of a WDM transmission system 4 to which a controller 2 according to a first embodiment is applied. FIG. 2 is a diagram illustrating the flow of a WDM signal 6 and the like in the WDM transmission system 4.

The WDM transmission system 4 includes a transmission fiber 10 and terminals A and B connected by the transmission fiber 10. The terminal A includes a plurality of optical transceivers that transmits and receives optical signals $\lambda_1$ to $\lambda_n$ having different wavelengths. The terminal A includes a multiplexer 12 that multiplexes optical signals output by a plurality of transmitters Tx and outputs a WDM signal 6 (i.e., an optical signal). The plurality of transmitters Tx are modules contained in different optical transceivers, respectively. The same applies to receivers Rx and Rx' and a transmitter Tx', which will be described later. The multiplexer 12 is, for example, an arrayed waveguide grating (AWG). The multiplexer 12 may be a wavelength selective switch (WSS)) or an optical coupler.

The terminal A further includes a WDM signal detection module 14 that detects the WDM signal 6 (see, e.g., FIG. 2). The WDM signal detection module 14 includes, for example, an optical splitter, a photo detector (e.g., a photodiode, the same applies hereinafter), and a detection circuit that processes a photocurrent output from the photo detector. Details of the WDM signal detection module 14 will be described with reference to FIG. 13 (to be described later). The same applies to other modules (e.g., a scattered light monitor 18).

The terminal A further includes an optical fiber amplifier 16 (a so-called post amplifier) that amplifies the WDM signal 6. The optical fiber amplifier 16 is, for example, an erbium doped fiber amplifier (EDFA). The same applies to optical fiber amplifiers 236, 216, and 36 which will be described later. The terminal A further includes the scattered light monitor 18 that detects ASS (i.e., amplified spontaneous scattered light) 22 of excitation light 20 (to be described later).

The amplified spontaneous Raman scattered light is generated in the same direction as and in the opposite direction to the traveling direction of the excitation light, respectively. The ASS 22 is scattered light (i.e., rear ASS) that travels in the opposite direction to the excitation light 20. ASS 223, ASS 222, and ASS 23, which will be described later, are also rear ASS.

The scattered light monitor 18 outputs a signal (e.g., a photocurrent) according to the light intensity (i.e., the scattered light intensity) of the ASS 22. The scattered light monitor 18 includes, for example, an optical splitter and a photo detector.

The terminal A further includes an optical transmitter 24 (hereinafter, referred to as an OSC transmitter 24) that transmits a request or information from the controller 2 to the terminal B via the transmission fiber 10 (i.e., an optical fiber). The OSC transmitter 24 uses an optical supervisory channel (OSC) to transmit the request or information of the controller 2 to an optical receiver 232 (hereinafter, referred to as an OSC receiver) of the terminal B.

The OSC transmitter 24 includes, for example, an optical filter and an OSC SFP Tx. The OSC SFP Tx is an optical transmitter of a small form-factor Pluggable (OSC SFP) transceiver.

The terminal A further includes a Raman amplifier (i.e., a front-exciting Raman amplifier) 26 that amplifies the WDM signal 6 transmitted from one end E1 of the transmission fiber 10 to the other end E2 by inputting the excitation light 20 to the one end E1 of the transmission fiber 10. The front-exciting Raman amplifier 26 includes, for example, an optical filter and an excitation light source.

The terminal A further includes the controller 2 that controls the front-exciting Raman amplifier 26. In the example illustrated in FIG. 1, the controller 2 controls a rear-exciting Raman amplifier 30, which will be further described later. However, the rear-exciting Raman amplifier 30 may be controlled by a device other than the controller 2.

The terminal B has a Raman amplifier (i.e., a rear-exciting Raman amplifier) 230 that amplifies the WDM signal 6 by inputting excitation light 221 (excitation light different from the excitation light 20) to the other end E2 of the transmission fiber 10. The basic structure of the rear-exciting Raman amplifier 230 is substantially the same as that of the front-exciting Raman amplifier 26 of the terminal A.

The terminal B further includes the OSC receiver 232 that receives the request or information from the controller 2 of the terminal A via the transmission fiber 10. The OSC receiver 232 includes, for example, an optical filter and an OSC SFP Rx. The OSC SFP Rx is an optical receiver for an OSC SFP transceiver.

The terminal B further includes a WDM signal monitor 234 that outputs an electric signal (e.g., a photocurrent) corresponding to the light intensity of the WDM signal 6. The basic structure of the WDM signal monitor 234 is substantially the same as the structure of the scattered light monitor 18 of the terminal A. The WDM signal monitor 234 is also a scattered light monitor that detects the ASS 223 of the rear-exciting Raman amplifier 230.

The terminal B further includes an optical fiber amplifier 236 (a so-called pre-amplifier) that further amplifies the WDM signal 6 amplified by the rear-exciting Raman amplifier 230. The structure of the optical fiber amplifier 236 is substantially the same as the structure of the optical fiber amplifier 16 of the terminal A.

The terminal B further includes a de-multiplexer 238 that de-multiplexes the WDM signal amplified by the optical fiber amplifier 236 into a plurality of optical signals $\lambda_1$ to $\lambda_n$ having different wavelengths. The de-multiplexer 238 may be, for example, any of an AWG, a WSS, and an optical coupler.

The terminal B further includes a plurality of receivers Rx' that receives the optical signals $\lambda_1$ to $\lambda_n$ into which the WDM signal is de-multiplexed by the de-multiplexer 238, and converts the optical signals $\lambda_1$ to $\lambda_n$ into electric signals.

The terminal B further includes a plurality of transmitters Tx', a multiplexer 212, a WDM signal detection module 214, an optical fiber amplifier 216, a scattered light monitor 218, an OSC transmitter 224, a front-exciting Raman amplifier 226, and a controller 202. The structure and function of the plurality of transmitters Tx' and the like are substantially the same as the structure and function of the corresponding device and module of the terminal A. For example, the structure and function of the plurality of transmitters Tx' are substantially the same as the structure and function of the plurality of transmitters Tx of the terminal A.

Similarly, the terminal A includes the rear-exciting Raman amplifier 30, an OSC receiver 32, a WDM signal monitor 34, an optical fiber amplifier 36, a de-multiplexer 38, and a plurality of receivers Rx. The structure and function of the plurality of rear-exciting Raman amplifiers 30 and the like are substantially the same as the structure and function of the corresponding device or module of the terminal B. For example, the structure and function of the rear-exciting Raman amplifier 30 are substantially the same as the structure and function of the rear-exciting Raman amplifier 230 at the terminal B.

The Raman amplifiers (i.e., the front-exciting Raman amplifier and the rear-exciting Raman amplifier) are optical amplifiers characterized by low noise. The WDM signal 6 is amplified double by the front-exciting Raman amplifier 26 and the rear-exciting Raman amplifier 230, and then is input to the optical fiber amplifier 236 of the terminal B. The WDM signal 6 input to the optical fiber amplifier 236 of the terminal B is amplified by the double amplification while suppressing deterioration of the OSNR. Therefore, the OSNR of the WDM signal 6 output from the optical fiber amplifier 236 of the terminal B is high.

The WDM transmission system 4 includes a transmission fiber 210 disposed between the front-exciting Raman amplifier 226 of the terminal B and the rear-exciting Raman amplifier 30 of the terminal A. A WDM signal 206 generated by the plurality of transmitters Tx' of the terminal B and the multiplexer 212 is transmitted to the terminal A by the transmission fiber 210. The WDM signal 206 is amplified by the optical fiber amplifier 216 and the front-exciting Raman amplifier 226 on the terminal B side and is amplified by the rear-exciting Raman amplifier 30 and the optical fiber amplifier 36 on the terminal A side.

The WDM signal 206 amplified by the optical fiber amplifier 36 or the like is de-multiplexed by the de-multiplexer 38 into a plurality of optical signals having different wavelengths. The optical signals into which the WDM signal 206 is de-multiplexed by the de-multiplexer 38 are received by the plurality of receivers Rx. The WDM signal monitor 34 outputs an electric signal (e.g., a photocurrent) corresponding to the light intensity of the WDM signal 206 before being amplified by the optical fiber amplifier 36.

The front-exciting Raman amplifier 226 of the terminal B outputs excitation light 220. A portion of the ASS 222 of the excitation light 220 is converted into an electric signal (e.g., a photocurrent) by the scattered light monitor 218 of the terminal B. The rear-exciting Raman amplifier 30 of the terminal A outputs excitation light 21. A portion of the ASS 23 of the excitation light 21 is converted into an electric signal (e.g., a photocurrent) by the WDM signal monitor 34 of the terminal A. That is, the WDM signal monitor 34 is also a scattered light monitor that outputs an electric signal corresponding to the light intensity of the ASS 23.

The OSC transmitter 224 of the terminal B transmits a request or information of the controller 202 to the terminal A via the transmission fiber 210. The OSC receiver 32 of the terminal A receives the request or information of the controller 202 and transmits it to the controller 2. The OSC transmitter 224 transmits the request or information of the controller 202 to the OSC receiver 32 by using an optical monitoring channel. The controller 202 of the terminal B controls the front-exciting Raman amplifier 226 and the rear-exciting Raman amplifier 230.

The WDM transmission system 4 further includes a network management system (NMS) 40 connected to the controllers 2 and 202. The NMS 40 manages, for example, operation information 90 (see, e.g., FIG. 4 which will be described later), transmission information 92, excitation information 94, and the like.

The operation information 90 is information indicating whether the WDM transmission system 4 is in operation. The transmission information 92 is information indicating whether the WDM signal 6 is being transmitted via the transmission fiber 10. The excitation information 94 is information indicating whether the excitation light 221 is being input to the other end of the transmission fiber 10.

A management system (not illustrated) of the terminal A uses the WDM signal detection module 14 to monitor whether the WDM signal 6 is being output from the multiplexer 12. The management system of the terminal A periodically reports the transmission information 92 to the NMS 40 based on the monitoring result. The transmission information 92 may be input to the NMS 40 by an administrator of the WDM transmission system 4. A management system (not illustrated) of the terminal B monitors the rear-exciting Raman amplifier 230 and periodically reports the excitation information 94 to the NMS 40 based on the monitoring result.

The bands of the WDM signals 6 and 206 are, for example, 1528 nm to 1567 nm. The bands of the WDM signals 6 and 206 may be 1530 nm to 1610 nm.

The wavelength bands of the excitation lights 20, 21, 220, and 221 are, for example, 1420 nm to 1470 nm. The wavelengths of the excitation lights 20, 21, 220, and 221 may be single (e.g., 1450 nm). The wavelength band of the optical monitoring channel is, for example, 1505 nm to 1517 nm.

(2) Structure (2-1) Functional Block

Figure 3:
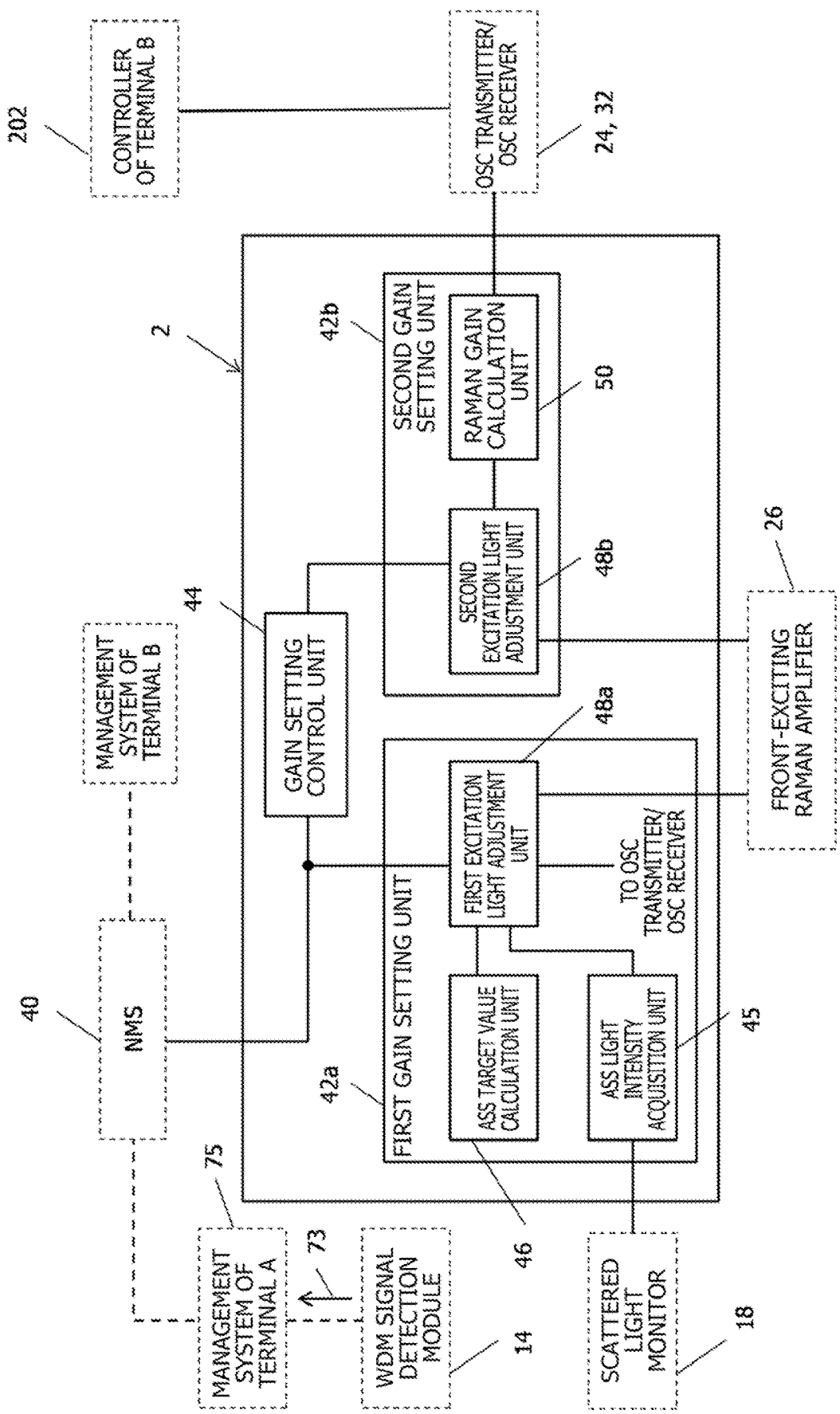
FIG. 3 is a diagram illustrating an example of functional blocks of the controller 2 according to the first embodiment.
Figure 4:
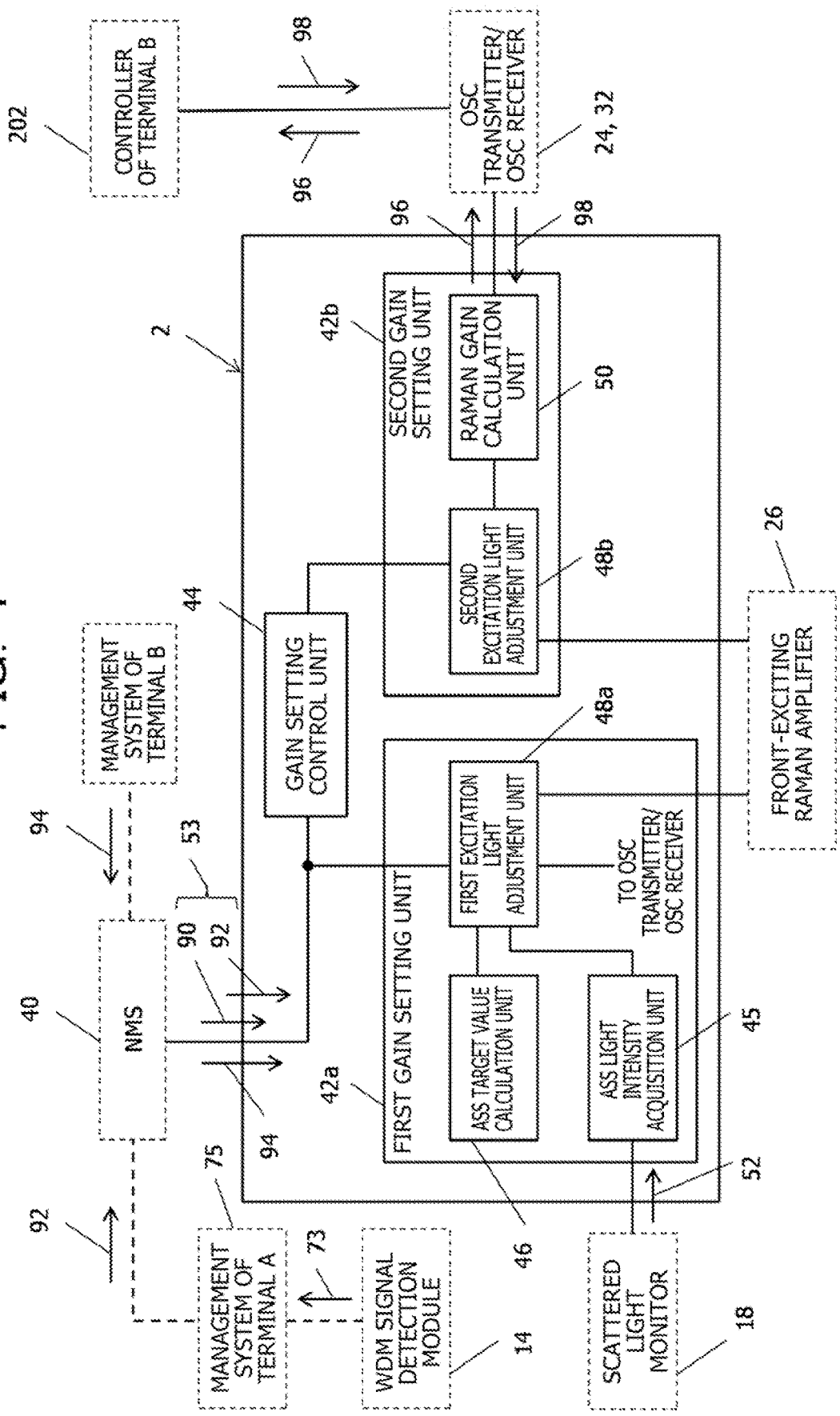
FIG. 4 is a diagram illustrating the flow of information and signals in FIG. 3.

FIG. 3 is a diagram illustrating an example of the functional block of the controller 2 according to the first embodiment. In FIG. 3, a device and the like (e.g., the NMS 40) connected to the controller 2 is also indicated by the broken lines. FIG. 4 is a diagram illustrating the flow of information and signals in FIG. 3.

As illustrated in FIG. 3, the controller 2 includes a first gain setting unit 42a, a second gain setting unit 42b, and a gain setting control unit 44.

[First Gain Setting Unit 42a]

The first gain setting unit 42a sets the Raman gain of the front-exciting Raman amplifier 26 (see, e.g., FIG. 3) based on the light intensity of the ASS 22 of the excitation light 20 (see, e.g., FIG. 2). The first gain setting unit 42a includes, for example, an ASS light intensity acquisition unit 45, an ASS target value calculation unit 46, and a first excitation light adjustment unit 48a. The functions and operations of the ASS light intensity acquisition unit 45 and the like will be described later (see, e.g., "(3) operation").

The Raman gain is approximately proportional to the light intensity (i.e., light power) of ASS. The first gain setting unit 42a calculates the light intensity $P_{ass,target}$ of the ASS 22, for example, when the Raman gain of the front-exciting Raman amplifier 26 matches a target value $G_{target}$ (e.g., 10 dB), in order to set the Raman gain of the front-exciting Raman amplifier 26. $P_{ass,target}$ is a target value of the ASS 22 (i.e., an ASS target value). $P_{ass,target}$ is calculated based on, for example, the relational expression between the light intensity of the ASS 22 and the Raman gain.

The first gain setting unit 42a further controls the front-exciting Raman amplifier 26 to adjust the light intensity of the excitation light 20 (i.e., the excitation light intensity) so that the light intensity of the ASS 22 becomes the ASS target value $P_{ass,target}$. The target value $G_{target}$ of the Raman gain is recorded in advance in, for example, a non-volatile memory 56 (see, e.g., FIG. 5) which will be described later. The light intensity of the ASS 22 is calculated from, for example, a signal 52 output by the scattered light monitor 18 (see, e.g., FIG. 4).

[Effect of WDM Signal 6 on Raman Gain Setting]

Reflection points that reflect the WDM signal 6 are scattered in a transmission path of the WDM signal 6. For example, the transmission fiber 10 is connected to the front-exciting Raman amplifier 26 by an optical connector, while the WDM signal 6 is reflected by the optical connector.

The reflected light of the WDM signal 6 by the optical connector is weak (e.g., −20 dBm). However, since the ASS 22 is also weak (e.g., −22 dBm), the output of the scattered light monitor 18 is strongly affected by the reflected light of the WDM signal 6. Therefore, when the WDM signal 6 is in communication, it is difficult to calculate the ASS light intensity based on the output of the scattered light monitor 18.

Further, when the WDM signal 6 is amplified by the front-exciting Raman amplifier 26, the reflected light is generated by induced Brillouin scattering of the amplified WDM signal 6. Therefore, even when the reflected light by the optical connector or the like is small, when the WDM signal 6 is communicated via the transmission fiber 10, it is difficult to calculate the ASS light intensity based on the output of the scattered light monitor 18. Therefore, when the WDM signal 6 is in communication, it is difficult to set the Raman gain based on the ASS light intensity.

As is clear from the above description, the Raman gain setting of the first gain setting unit 42a based on the light intensity of the ASS 22 is easy when the WDM signal 6 is in non-communication, but it is difficult when the WDM signal 6 is in communication. That is, the first gain setting unit 42a is suitable for setting the Raman gain when the WDM signal 6 is in non-communication.

[Second Gain Setting Unit 42b]

The second gain setting unit 42b sets the Raman gain of the front-exciting Raman amplifier 26 based on the light intensity (i.e., the light power) of the WDM signal 6 output from the transmission fiber 10. The second gain setting unit 42b includes, for example, a Raman gain calculation unit 50 and a second excitation light adjustment unit 48b. The Raman gain calculation unit 50 and the second excitation light adjustment unit 48b will be described later (see "(3) operation").

The transmission fiber 10 (see, e.g., FIG. 2) is an amplification medium for the front-exciting Raman amplifier 26. The gain of the front-exciting Raman amplifier 26 is the intensity ratio (=$P_{on}/P_{off}$) between the light intensity $P_{on}$ of the WDM signal 6 when the excitation light 20 is input to the transmission fiber 10 and the light intensity $P_{off}$ when the excitation light 20 is not input to the transmission fiber 10. The light intensity $P_{on}$ is the light intensity of the WDM signal 6 output from one end E2 on the terminal B side of the transmission fiber 10 when the excitation light 20 is input to the transmission fiber 10. The light intensity $P_{off}$ is the light intensity of the WDM signal 6 output from one end E2 on the terminal B side of the transmission fiber 10 when the excitation light 20 is not input to the transmission fiber 10.

Since the second gain setting unit 42b sets, for example, the Raman gain in the front-exciting Raman amplifier 26, the second gain setting unit 42b calculates the Raman gain (=$P_{on}/P_{off}$) from the light intensities $P_{on}$ and $P_{off}$ of the WDM signal 6 when the excitation light 20 is input and when the excitation light 20 is not input. The second gain setting unit 42b further controls the front-exciting Raman amplifier 26 to adjust the light intensity of the excitation light 20 so that the Raman gain (=$P_{on}/P_{off}$) calculated from the light intensities $P_{on}$ and $P_{off}$ of the WDM signal 6 becomes the target value $G_{target}$ of the Raman gain. That is, the second gain setting unit 42b adjusts the excitation light intensity so that the Raman gain (e.g., $P_{on}/P_{off}$) calculated based on the light intensities (e.g., $P_{on}$ and $P_{off}$) of the WDM signal 6 output from the transmission fiber 10 becomes the target value $G_{target}$ of the Raman gain.

Therefore, when the WDM signal 6 is in communication, it is easy to set the Raman gain of the front-exciting Raman amplifier 26 based on the light intensity of the WDM signal 6 output from the transmission fiber 10. However, when the WDM signal 6 is in non-communication, it is difficult to set the Raman gain based on the light intensity of the WDM signal 6 because there is no WDM signal 6. That is, the second gain setting unit 42b is suitable for setting the Raman gain when the WDM signal 6 is in communication.

[Gain Setting Control Unit 44]

The gain setting control unit 44 acquires communication-related information 53 regarding the communication of the WDM signal 6 in the transmission fiber 10 from, for example, the NMS 40. When the acquired communication-related information 53 does not indicate the communication of the WDM signal 6, the gain setting control unit 44 causes the first gain setting unit 42a to set the Raman gain of the front-exciting Raman amplifier 26. Meanwhile, when the acquired communication-related information 53 indicates the communication of the WDM signal 6, the gain setting control unit 44 causes the second gain setting unit 42b to set the Raman gain of the front-exciting Raman amplifier 26.

That is, when the communication-related information 53 does not indicate the communication of the WDM signal 6, the controller 2 causes the first gain setting unit 42a suitable for setting the Raman gain when the WDM signal 6 is in non-communication, to set the Raman gain. Meanwhile, when the communication-related information 53 indicates the communication of the WDM signal 6, the controller 2 causes the second gain setting unit 42b suitable for setting the Raman gain when the WDM signal 6 is in communication, to set the Raman gain. Therefore, according to the controller 2, the gain of the front-exciting Raman amplifier 26 may be set regardless of whether the WDM signal 6 is communicating via the transmission fiber 10.

(2-2) Hardware

[Controller 2]

Figure 5:
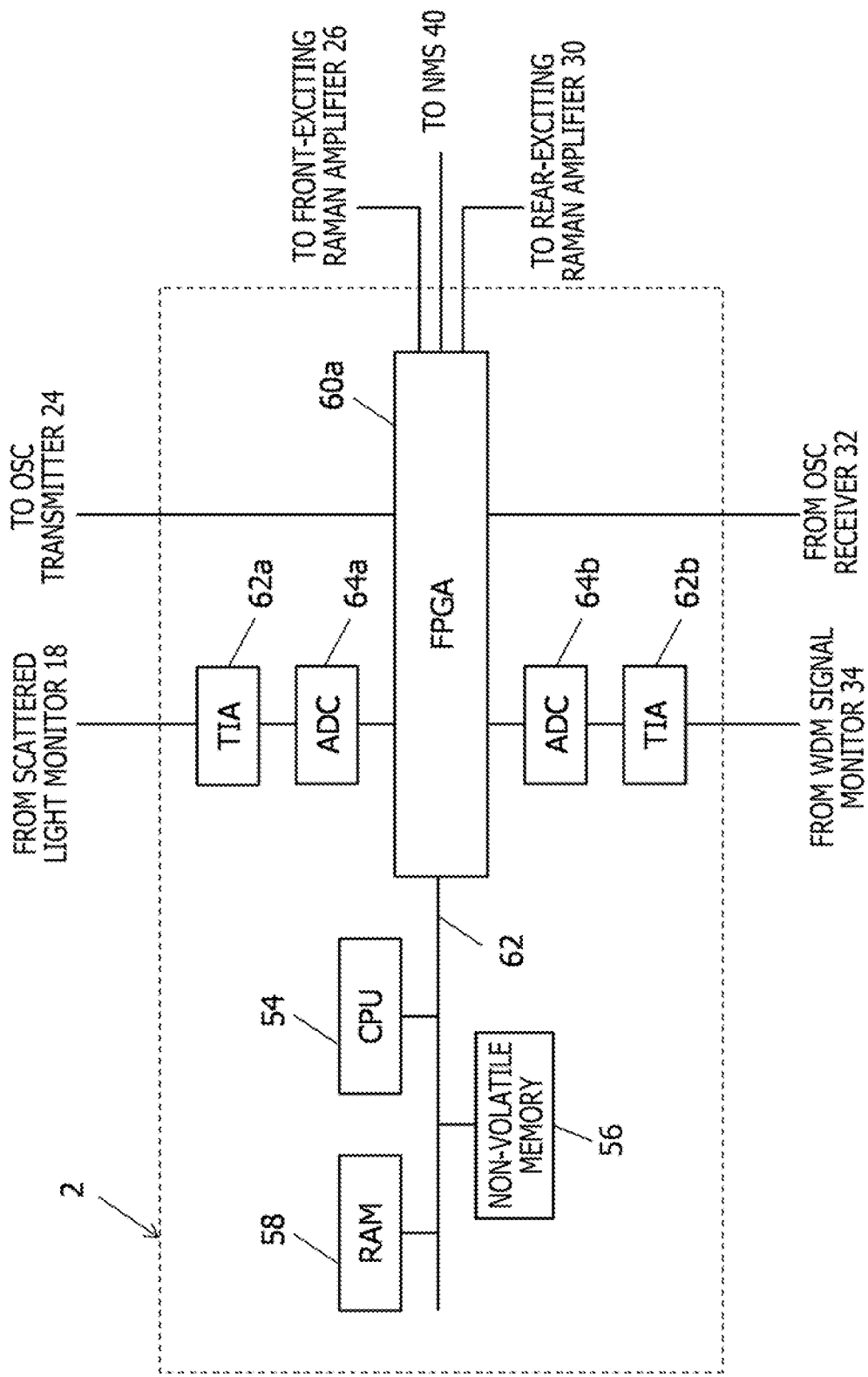
FIG. 5 is a diagram illustrating an example of the hardware configuration of the controller 2.
Figure 6:
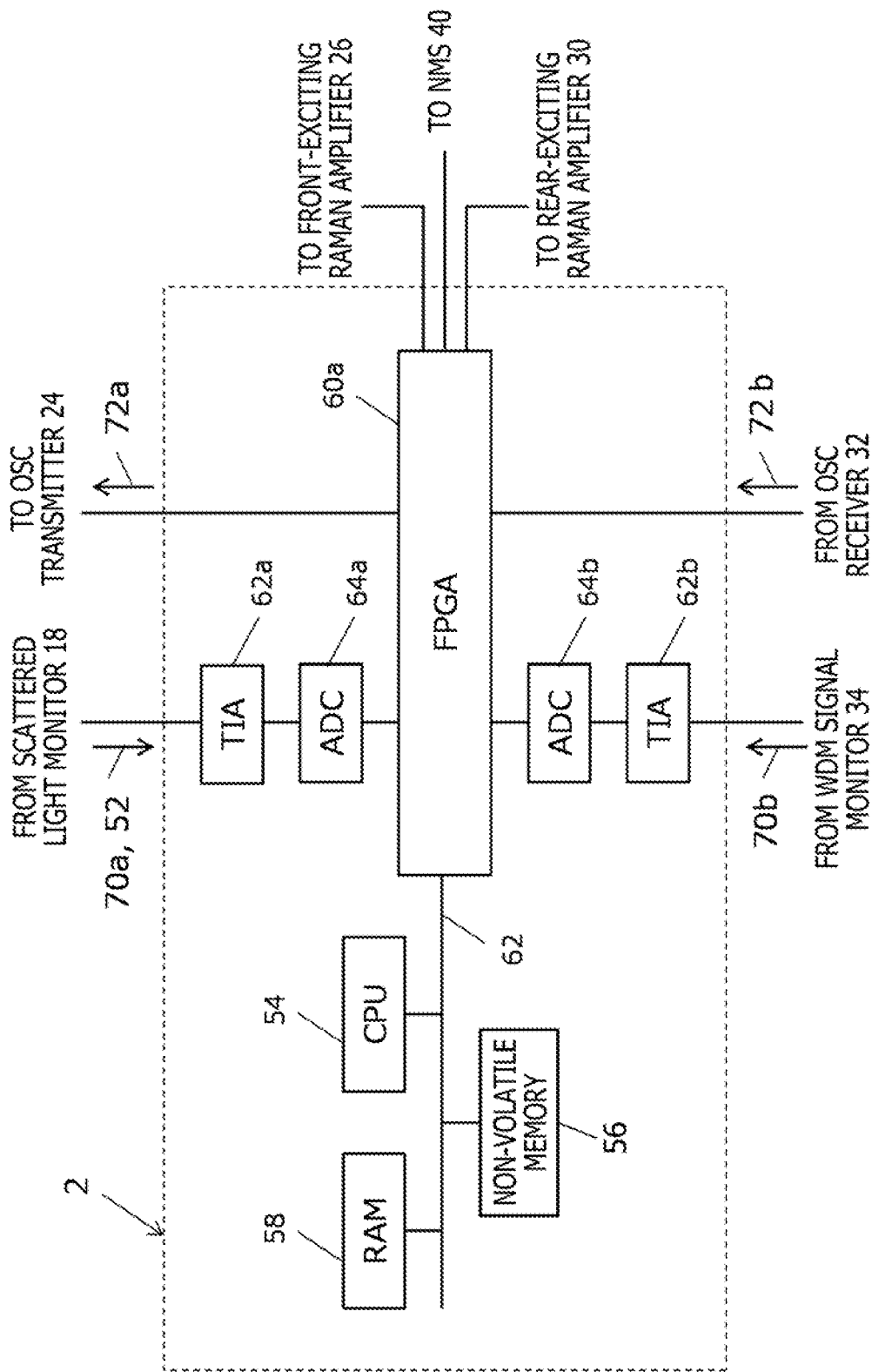
FIG. 6 is a diagram illustrating the flow of signals in FIG. 5.

FIG. 5 is a diagram illustrating an example of the hardware configuration of the controller 2. FIG. 6 is a diagram illustrating the flow of signals in FIG. 5. The controller 2 includes a central processing unit (CPU) 54, a non-volatile memory 56, a random access memory (RAM) 58, and a field-programmable gate array (FPGA) 60a.

The controller 2 further includes a bus 62 that interconnects the CPU 54, the RAM 58, the non-volatile memory 56, and the FPGA 60a. The controller 2 further includes two trans-impedance amplifiers (TIAs) 62a and 62b and two analog-to-digital converters (ADCs) 64a and 64b.

The RAM 58 is, for example, a dynamic random access memory (DRAM). The RAM 58 may be a static random access memory (SRAM). The non-volatile memory 56 is, for example, a flash memory. The non-volatile memory 56 may be a read only memory (ROM).

The non-volatile memory 56 stores a program for controlling the front-exciting Raman amplifier 26, a program for controlling the rear-exciting Raman amplifier 30, a target value of the Raman gain of each of the front-exciting Raman amplifier 26 and the rear-exciting Raman amplifier 30, and the like.

The CPU 54 loads the programs stored in the non-volatile memory 56 into the RAM 58 and executes the loaded programs. Work variables, data, and the like used for processes executed by the CPU 54 are also temporarily stored in the RAM 58.

The FPGA 60a is connected to the CPU 54, the RAM 58, the non-volatile memory 56, the ADC 64a, the ADC 64b, the OSC transmitter 24, the OSC receiver 32, the front-exciting Raman amplifier 26, the rear-exciting Raman amplifier 30, and the NMS 40. The FPGA 60a functions as, for example, an interface that relays exchange of information and requests (i.e., commands) between the ADCs 64a to NMS 40 and the CPU 54.

The TIA 62a converts a photocurrent 70a (the signal 52 in FIG. 4) output by the scattered light monitor 18 (see, e.g., FIG. 2) into a voltage. The ADC 64a converts the output of the TIA 62a into a digital signal and inputs the digital signal to the FPGA 60a. Similarly, the TIA 62b converts a photocurrent 70b output by the WDM signal monitor 34 (see, e.g., FIG. 2) into a voltage. The output of the TIA 62b is converted by the ADC 64b into a digital signal which is then input to the FPGA 60a.

The gain setting control unit 44 (see, e.g., FIG. 3) is implemented by, for example, the CPU 54, the RAM 58, the non-volatile memory 56, and the FPGA 60a. Similarly, the first gain setting unit 42a is implemented by the CPU 54, the RAM 58, the non-volatile memory 56, and the FPGA 60a. Similarly, the second gain setting unit 42b is implemented by the CPU 54, the RAM 58, the non-volatile memory 56, and the FPGA 60a.

[Scattered Light Monitor 18]

Figure 7:
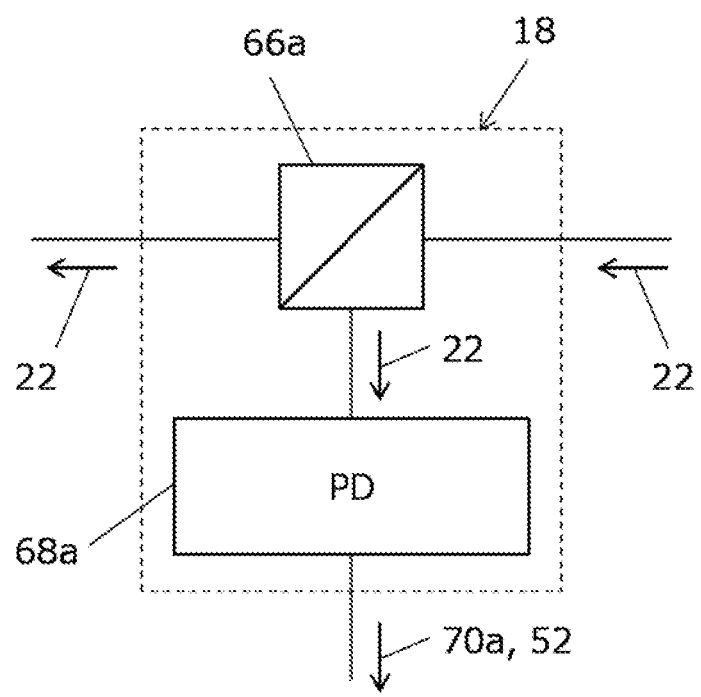
FIG. 7 is a diagram illustrating an example of the hardware configuration of a scattered light monitor 18.

FIG. 7 is a diagram illustrating an example of the hardware configuration of the scattered light monitor 18. The scattered light monitor 18 includes an optical splitter 66a that branches a portion of the ASS 22 (see, e.g., FIG. 2), and a photo detector 68a that photo-electrically converts the branched portion of the ASS 22 and outputs a photocurrent 70a (see the signal 52 in FIG. 4). The photocurrent 70a output from the photo detector 68a is converted into a voltage by the TIA 62a (see, e.g., FIG. 6).

[WDM Signal Monitor 34]

Figure 8:
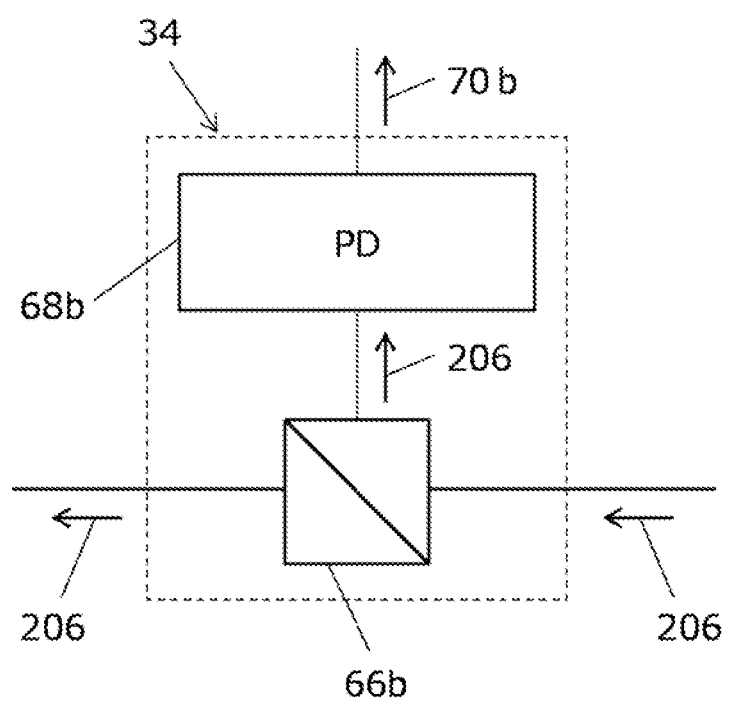
FIG. 8 is a diagram illustrating an example of the hardware configuration of a WDM signal monitor 34.

FIG. 8 is a diagram illustrating an example of the hardware configuration of the WDM signal monitor 34.

The WDM signal monitor 34 includes an optical splitter 66b that branches a portion of the WDM signal 206 (see, e.g., FIG. 2), and a photo detector 68b that photo-electrically converts the branched portion of the WDM signal 206 and outputs a photocurrent 70b. The photocurrent 70b output from the photo detector 68b is converted into a voltage by the TIA 62b (see, e.g., FIG. 6). The optical splitter 66b also branches the ASS 23 (i.e., the rear ASS) of the excitation light 21 (see, e.g., FIG. 2), but the ASS 23 may be ignored because it is weaker than the WDM signal 206.

[OSC Transmitter 24]

Figure 9:
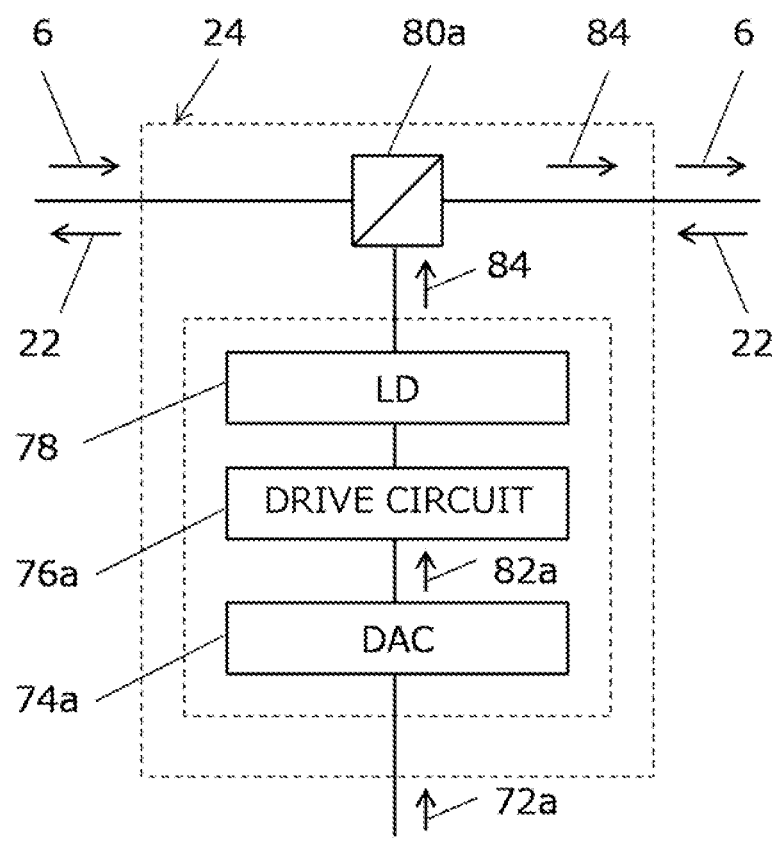
FIG. 9 is a diagram illustrating an example of the hardware configuration of an optical supervisory channel (OSC) transmitter 24.

FIG. 9 is a diagram illustrating an example of the hardware configuration of the OSC transmitter 24. The OSC transmitter 24 includes a digital analog converter (DAC) 74a, a semiconductor laser drive circuit 76a, a semiconductor laser 78, and an optical filter 80a. The DAC 74a converts a digital signal 72a indicating a request or information transmitted by the controller 2 to the terminal B into an analog signal 82a. The drive circuit 76a modulates the semiconductor laser 78 with an intensity corresponding to the magnitude of the analog signal 82a. Therefore, the semiconductor laser 78 outputs an optical signal 84 modulated according to the value of the digital signal 72a.

The optical filter 80a sends the optical signal 84 toward the transmission fiber 10. The optical filter 80a further transmits the WDM signal 6 and the ASS 22. The optical filter 80a is, for example, an optical component having a dielectric multilayer film and a pair of transparent prisms with the dielectric multilayer film interposed therebetween (the same applies to optical filters 80b to 80d which will be described later).

[OSC Receiver 32]

Figure 10:
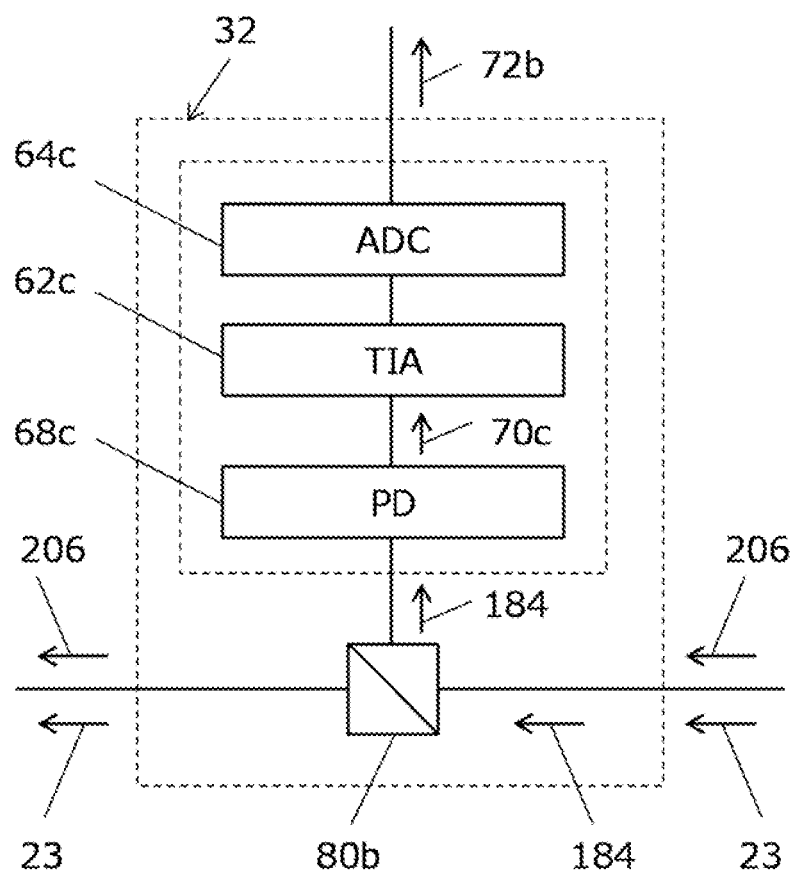
FIG. 10 is a diagram illustrating an example of the hardware configuration of an OSC receiver 32.

FIG. 10 is a diagram illustrating an example of the hardware configuration of the OSC receiver 32. The OSC receiver 32 includes an optical filter 80b, a photo detector 68c, a TIA 62c, and an ADC 64c.

The optical filter 80b transmits the WDM signal 206 and the ASS 23, and branches an OSC signal 184 transmitted by the OSC transmitter 224 of the terminal B. The photo detector 68c photo-electrically converts the branched OSC signal 184 and outputs a photocurrent 70c.

The TIA 62c converts the photocurrent 70c output from the photo detector 68c into a voltage. The ADC 64c converts the output of the TIA 62c into a digital signal 72b which is then input to the FPGA 60a (see, e.g., FIG. 6).

[Front-Exciting Raman Amplifier 26]

Figure 11:
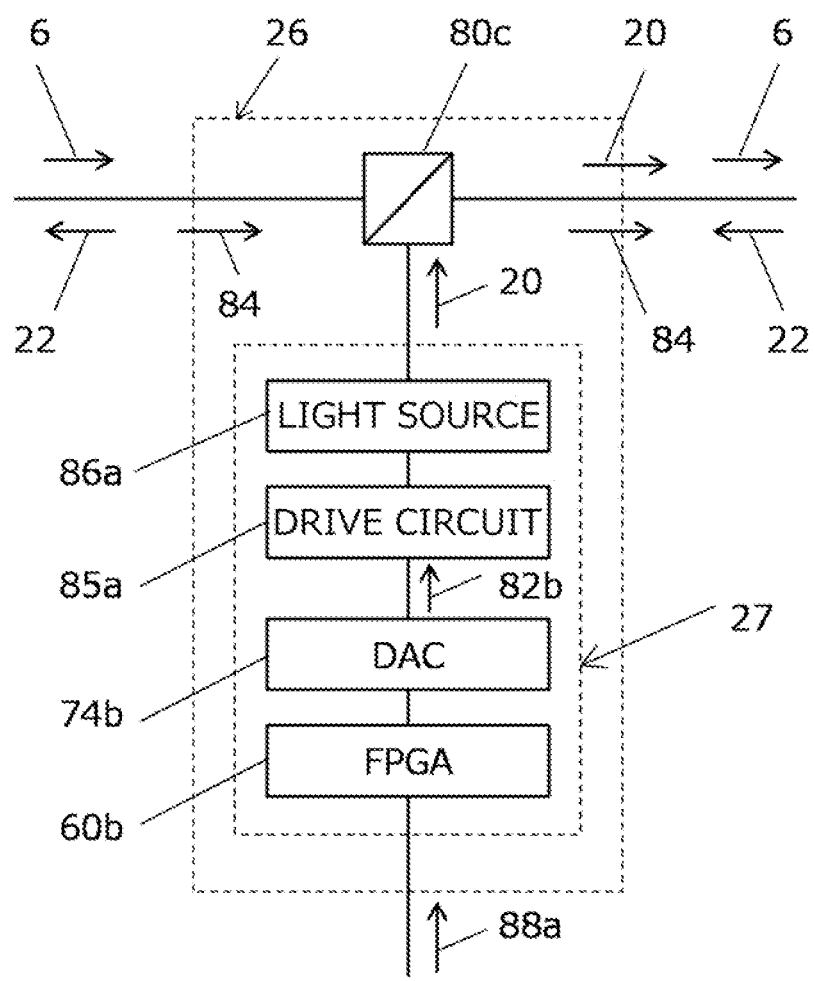
FIG. 11 is a diagram illustrating an example of the hardware configuration of a front-exciting Raman amplifier 26.

FIG. 11 is a diagram illustrating an example of the hardware configuration of the front-exciting Raman amplifier 26. The front-exciting Raman amplifier 26 includes a FPGA 60b, a DAC 74b, a light source drive circuit 85a, a light source 86a that outputs excitation light 20, and an optical filter 80c. The light source 86a is, for example, a semiconductor laser or an incoherent light source (see, e.g., Non-Patent Document 1).

The FPGA 60a (see, e.g., FIG. 5) of the controller 2 transmits a request 88a for setting the light intensity of the excitation light 20 to a set value $P_{set}$ to the FPGA 60b of the front-exciting Raman amplifier 26. When receiving the request 88a, the FPGA 60b calculates a value of a drive current that sets the light intensity of the excitation light 20 output from the light source 86a to the set value $P_{set}$. The DAC 74b converts the drive current value calculated by the FPGA 60b into an analog signal 82b.

The drive circuit 85a drives the light source 86a with a drive current corresponding to the magnitude of the analog signal 82b. Then, the light source 86a outputs the excitation light 20 whose light intensity is the set value $P_{set}$. The above-mentioned "drive current" may be a drive power, a drive voltage, or the like.

The optical filter 80c sends the excitation light 20 toward the transmission fiber 10. The optical filter 80c further transmits the WDM signal 6, the optical signal 84 output from the OSC transmitter 24, and the ASS 22.

[Rear-Exciting Raman Amplifier 30]

Figure 12:
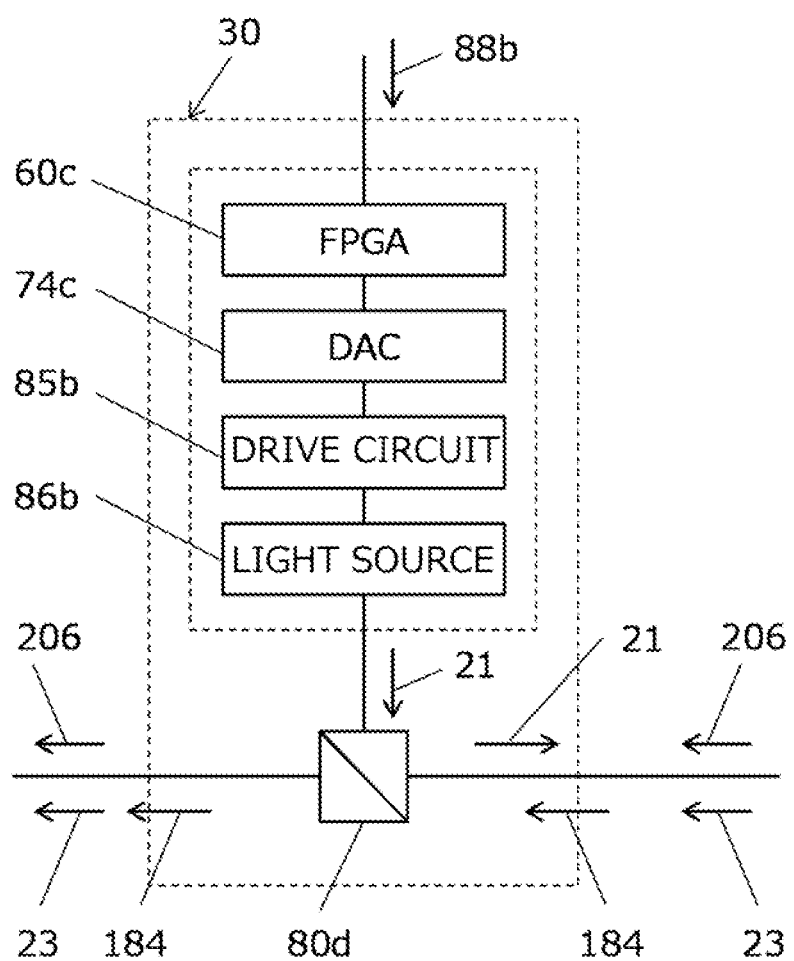
FIG. 12 is a diagram illustrating an example of the hardware configuration of a rear-exciting Raman amplifier 30.

FIG. 12 is a diagram illustrating an example of the hardware configuration of the rear-exciting Raman amplifier 30. The rear-exciting Raman amplifier 30 includes a FPGA 60c, a DAC 74c, a light source drive circuit 85b, a light source 86b that outputs excitation light 21, and an optical filter 80d. The light source 86b is, for example, a semiconductor laser.

The function of each part of the rear-exciting Raman amplifier 30 is substantially the same as the function of each part of the front-exciting Raman amplifier 26 described with reference to FIG. 11. However, a request 88b received by the rear-exciting Raman amplifier 30 is a request for setting the light intensity of the excitation light 21 (see, e.g., FIG. 2) of the rear-exciting Raman amplifier 30. The optical filter 80d sends the excitation light 21 toward the transmission fiber 210. The optical filter 80d further transmits the WDM signal 206, the OSC signal 184 from the OSC transmitter 224 of the terminal B, and the ASS 23.

[WDM Signal Detection Module 14]

Figure 13:
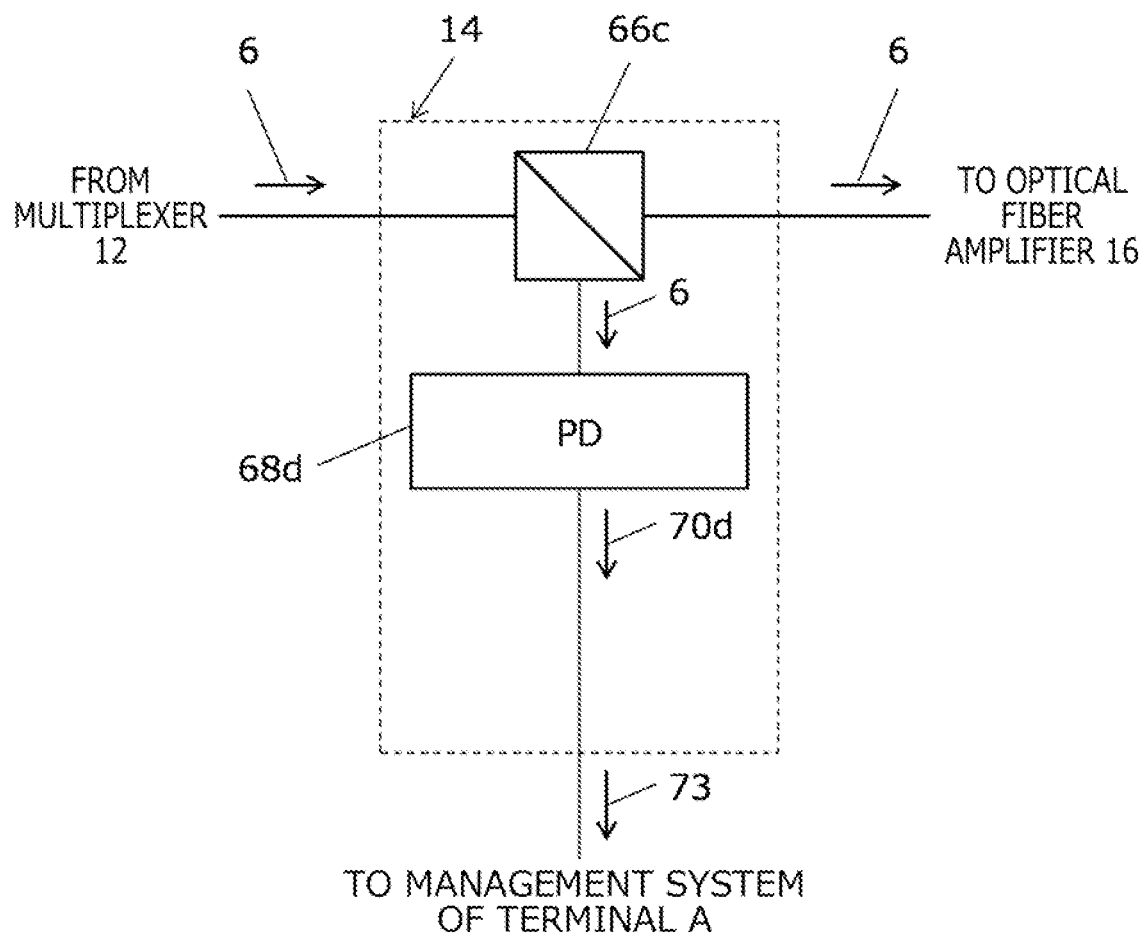
FIG. 13 is a diagram illustrating an example of the hardware configuration of a WDM signal detection module 14.

FIG. 13 is a diagram illustrating an example of the hardware configuration of the WDM signal detection module 14. The WDM signal detection module 14 includes an optical splitter 66c that branches a portion of the WDM signal 6 (see, e.g., FIG. 2), and a photo detector 68d that photo-electrically converts the branched portion of the WDM signal 6 and outputs a photocurrent 70d. The WDM signal detection module 14 further includes a detection circuit 71 that processes the photocurrent 70d output from the photo detector 68d and outputs WDM signal information 73 indicating whether the WDM signal 6 is output from the multiplexer 12.

Figure 14:
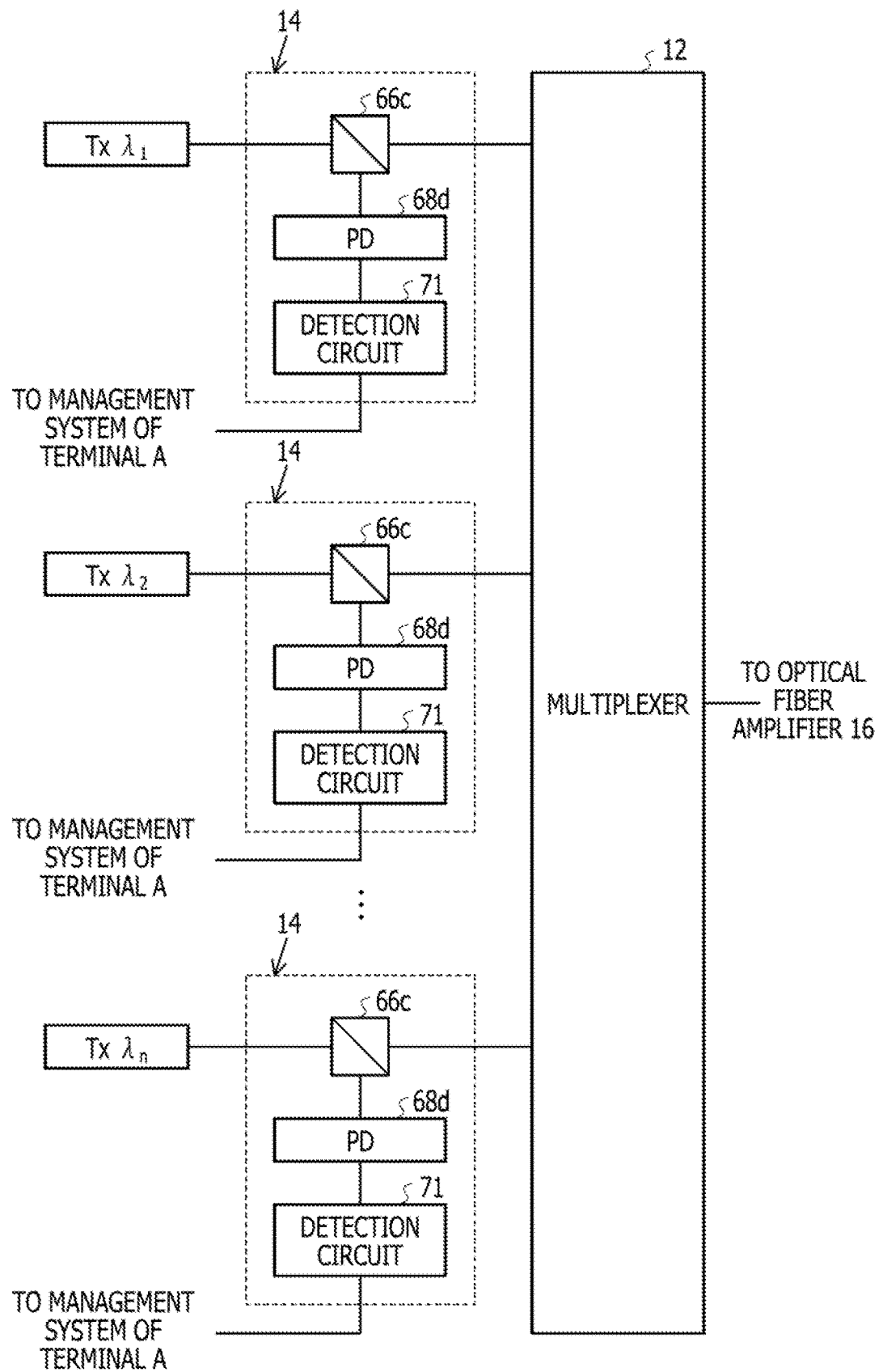
FIG. 14 is a diagram illustrating another example of the WDM signal detection module 14.

The WDM signal detection module 14 may have an optical channel monitor (OCM)) instead of the photo detector 68d and the detection circuit 71. FIG. 14 is a diagram illustrating another example of the WDM signal detection module 14.

In the example illustrated in FIG. 13, the WDM signal detection module 14 is disposed between the multiplexer 12 and the optical fiber amplifier 16. However, as illustrated in FIG. 14, one WDM signal detection module 14 may be interposed between an optical transmitter Txλi (i is an integer of 1 or more and n or less) and the multiplexer 12. In this case, the WDM signal information 73 output by the WDM signal detection module 14 connected to the optical transmitter Txλi indicates whether an optical signal is output from the optical transmitter Txλi.

(3) Operation

Here, an example of preferable operations executed by the controller 2 or the like in order to implement the functions described in "(2-1) Function Block" will be described.

(3-1) Operation of Gain Setting Control Unit 44

The gain setting control unit 44 (see, e.g., FIG. 4) acquires from, for example, the NMS 40 the operation information 90 indicating whether the WDM transmission system 4 having the transmission fiber 10 (see, e.g., FIG. 2) and the front-exciting Raman amplifier 26 is in operation. When the acquired operation information 90 indicates that the WDM transmission system 4 is in operation, the gain setting control unit 44 further acquires from, for example, the NMS the transmission information 92 indicating whether the WDM signal is being transmitted. The operation information 90 and the transmission information 92 each are one of the above-mentioned communication-related information 53 (see, e.g., FIG. 4).

Even when the WDM transmission system 4 is in operation, traffic of the WDM transmission system 4 may be temporarily lost, and as a result, the WDM signal 6 may be in non-communication. According to the transmission information 92, the non-communication of the WDM signal 6 in operation of the WDM transmission system 4 may be detected.

When the operation information 90 does not indicate that the WDM transmission system 4 is in operation, the gain setting control unit 44 causes the first gain setting unit 42a to set the Raman gain of the front-exciting Raman amplifier 26. Even when the operation information 90 indicates that the WDM transmission system 4 is in operation but the transmission information 92 does not indicate that the WDM signal 6 is being transmitted, the gain setting control unit 44 further causes the first gain setting unit 42a to set the Raman gain of the front-exciting Raman amplifier 26.

Meanwhile, when the operation information 90 indicates that the WDM transmission system 4 is in operation and the transmission information 92 indicates that the WDM signal 6 is being transmitted, the gain setting control unit 44 causes the second gain setting unit 42b to set the Raman gain of the front-exciting Raman amplifier 26.

(3-2) Operation of First Gain Setting Unit 42a

The first gain setting unit 42a includes, for example, the ASS light intensity acquisition unit 45 (see, e.g., FIG. 3), the ASS target value calculation unit 46, and the first excitation light adjustment unit 48a. The ASS light intensity acquisition unit 45, the ASS target value calculation unit 46, and the first excitation light adjustment unit 48a cooperate to set the Raman gain in the front-exciting Raman amplifier 26.

The ASS light intensity acquisition unit 45 acquires (e.g., calculates) the light intensity $P_{ass,mon}$ of the ASS 22 from the signal 52 output by the scattered light monitor 18. Meanwhile, the ASS target value calculation unit 46 calculates the light intensity $P_{ass,target}$ (i.e., the ASS target value) of the ASS 22 when the Raman gain of the front-exciting Raman amplifier 26 matches the target value $G_{target}$.

The first excitation light adjustment unit 48a adjusts the output (i.e., the light intensity of the excitation light 20) of the front-exciting Raman amplifier 26 so that the scattered light intensity $P_{ass,mon}$ acquired by the ASS light intensity acquisition unit 45 becomes the ASS target value $P_{ass,target}$. The Raman gain of the front-exciting Raman amplifier 26 is set by this adjustment.

[Gain Setting in Non-Communication State in Operation]

When traffic temporarily disappears in operation of the WDM transmission system 4, the WDM signal 6 is not transmitted. Alternatively, even when each device of the WDM transmission system 4 is activated to start the operation of the WDM transmission system 4, the WDM signal 6 is not transmitted until signal input to the transmitter Tx is started. In such a case, the operation information 90 indicates that the WDM transmission system 4 is in operation, and the transmission information 92 does not indicate that the WDM signal 6 is being transmitted.

When the WDM transmission system 4 is in operation but the WDM signal 6 is not transmitted, the rear-exciting Raman amplifier 230 of the terminal B inputs the excitation light 221 to the transmission fiber 10. Then, a portion of the ASS of the excitation light 221 propagates toward the terminal A and is incident on the scattered light monitor 18 of the terminal A. Then, data calculated from the output (i.e., the signal 52) of the scattered light monitor 18 does not correctly indicate the ASS light intensity of the excitation light 20 (i.e., the light intensity of the ASS 22) output from the front-exciting Raman amplifier 26. As a result, it becomes difficult to set the Raman gain based on the ASS light intensity. As is well known, the ASS (amplified spontaneous scattered light) propagates not only in rear of the excitation light but also in front of the excitation light.

Therefore, when the operation information 90 indicates that the WDM transmission system 4 is in operation and the transmission information 92 does not indicate that the WDM signal 6 is being transmitted (i.e., in a non-communication state in operation), the first excitation light adjustment unit 48a (see, e.g., FIG. 4) first acquires the excitation information 94 from the NMS 40. The excitation information 94 is information indicating whether the excitation light 221 is input to the other end E2 (see, e.g., FIG. 2) of the transmission fiber 10. When the excitation information 94 indicates that the excitation light 221 is being input, the first gain setting unit 42a interrupts the input of the excitation light 221 to the rear-exciting Raman amplifier 230 of the terminal B before setting the Raman gain of the front-exciting Raman amplifier 26.

When the excitation light input by the rear-exciting Raman amplifier 230 is interrupted, since the scattered light incident on the scattered light monitor 18 is only the ASS 22 (see, e.g., FIG. 2), the Raman gain may be set based on the ASS light intensity. The excitation information 94 may be acquired directly from the controller 2 of the terminal B via the OSC (i.e., the optical monitoring channel), not from the NMS 40.

The ASS target value calculation unit 46 is implemented by the CPU 54, the RAM 58, and the non-volatile memory 56. The ASS light intensity acquisition unit 45 is implemented by the CPU 54, the RAM 58, the non-volatile memory 56, and the FPGA 60a. The first excitation light adjustment unit 48a is implemented by the CPU 54, the RAM 58, the non-volatile memory 56, and the FPGA 60a.

(3-3) Operation of Second Gain Setting Unit 42b

The second gain setting unit 42b (see, e.g., FIG. 3) includes, for example, the Raman gain calculation unit 50 and the second excitation light adjustment unit 48b. The Raman gain calculation unit 50 and the second excitation light adjustment unit 48b cooperate to set the Raman gain in the front-exciting Raman amplifier 26.

[Raman Gain Calculation Unit 50]

The Raman gain calculation unit 50 calculates the Raman gain of the front-exciting Raman amplifier 26 based on light intensity information 98 (see, e.g., FIG. 4) indicating the light intensity of the WDM signal 6 output from the transmission fiber 10 (see, e.g., FIG. 2).

First, the Raman gain calculation unit 50 transmits, to the controller 202 of the terminal B via the OSC transmitter 24 (see, e.g., FIG. 2), a request 96 for transmitting the light intensity information 98. In response to the request 96, the controller 202 of the terminal B calculates the light intensity $P_{WDM}$ of the WDM signal 6 output from the transmission fiber 10, from the output (e.g., the photocurrent) of the WDM signal monitor 234 of the terminal B. The controller 202 of the terminal B further transmits the light intensity information 98 (see, e.g., FIG. 4) indicating the calculated light intensity $P_{WDM}$ to the OSC receiver 32 of the terminal A via the OSC transmitter 224. The Raman gain calculation unit 50 calculates the Raman gain of the front-exciting Raman amplifier 26 based on the light intensity information 98 received by the OSC receiver 32.

The light intensity $P_{WDM}$ indicated by the light intensity information 98 is, for example, the light intensity $P_{on}$ of the WDM signal 6 output from the transmission fiber 10 when the excitation light 20 is communicating, and the light intensity $P_{off}$ of the WDM signal 6 output from the transmission fiber 10 when the excitation light 20 is not communicating. The Raman gain calculation unit 50 calculates, for example, the intensity ratio ($=P_{on}/P_{off}$) between $P_{on}$ and $P_{off}$, which indicates the Raman gain.

[Second Excitation Light Adjustment Unit 48b]

The second excitation light adjustment unit 48b adjusts the output (i.e., the light intensity of the excitation light 20) of the front-exciting Raman amplifier 26 so that the Raman gain calculated by the Raman gain calculation unit 50 becomes the target value $G_{target}$ of the Raman gain. As a result of this adjustment, the Raman gain $G_{target}$ is set in the front-exciting Raman amplifier 26.

The Raman gain calculation unit 50 is implemented by the CPU 54, the RAM 58, the non-volatile memory 56, and the FPGA 60a. The second excitation light adjustment unit 48b is implemented by the CPU 54, the RAM 58, the non-volatile memory 56, and the FPGA 60a.

(3-4) Process Procedure (3-4-1) Process by Controller 2

Figure 15:
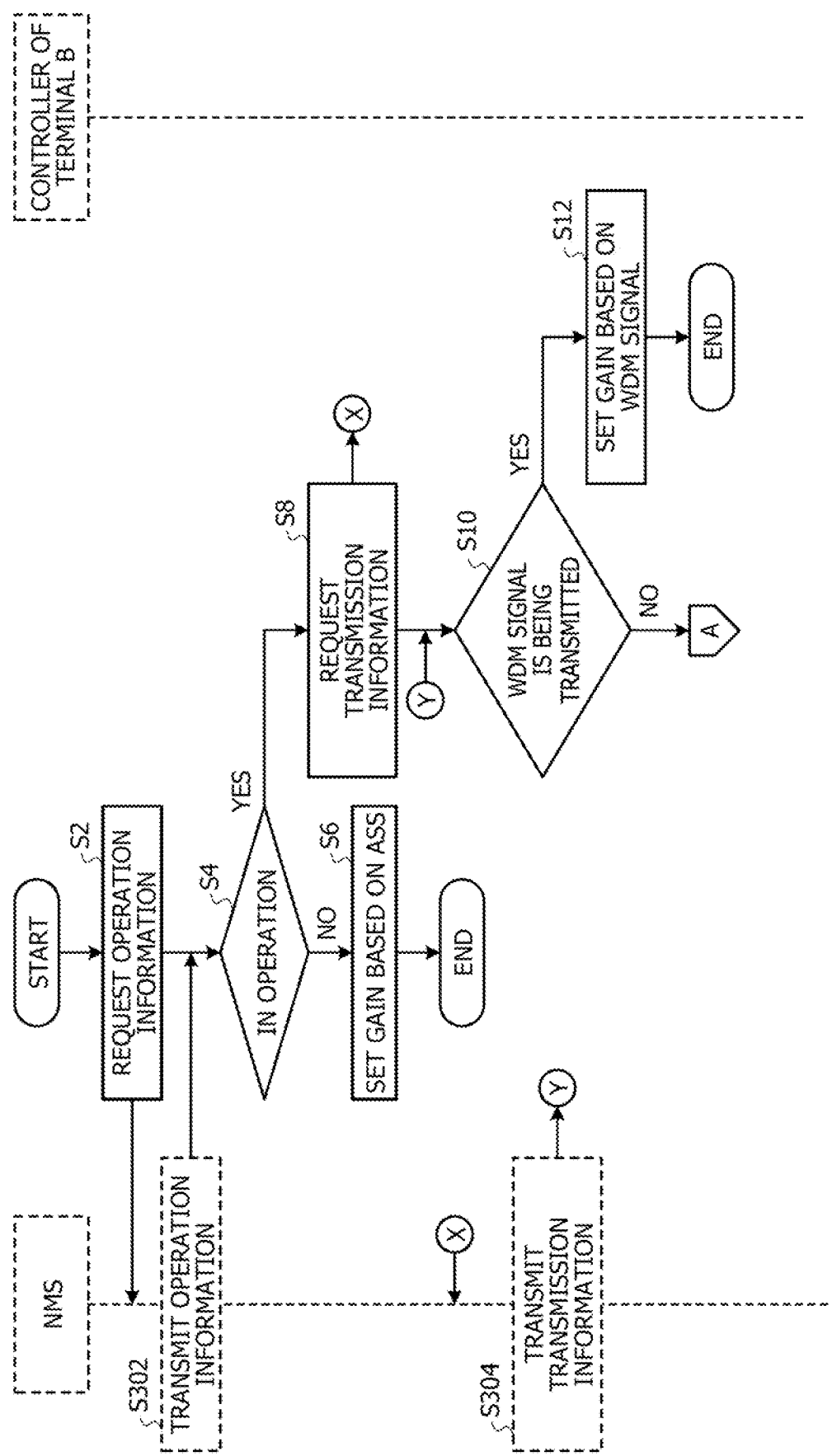
FIG. 15 is a flowchart illustrating an example of a process executed by the controller 2 for setting the gain of the front-exciting Raman amplifier 26.
Figure 16:
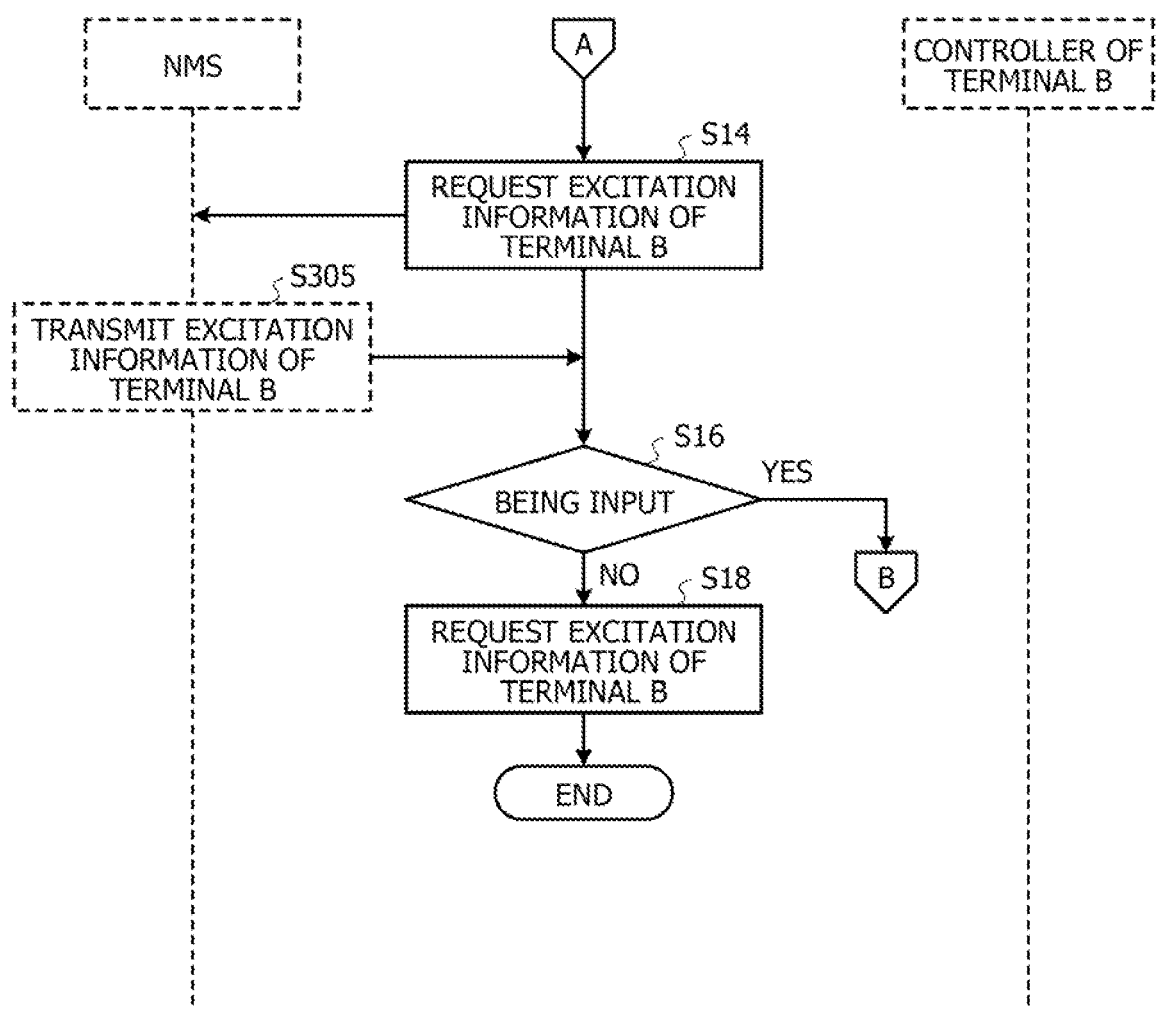
FIG. 16 is a flowchart illustrating an example of a process executed by the controller 2 for setting the gain of the front-exciting Raman amplifier 26.
Figure 17:
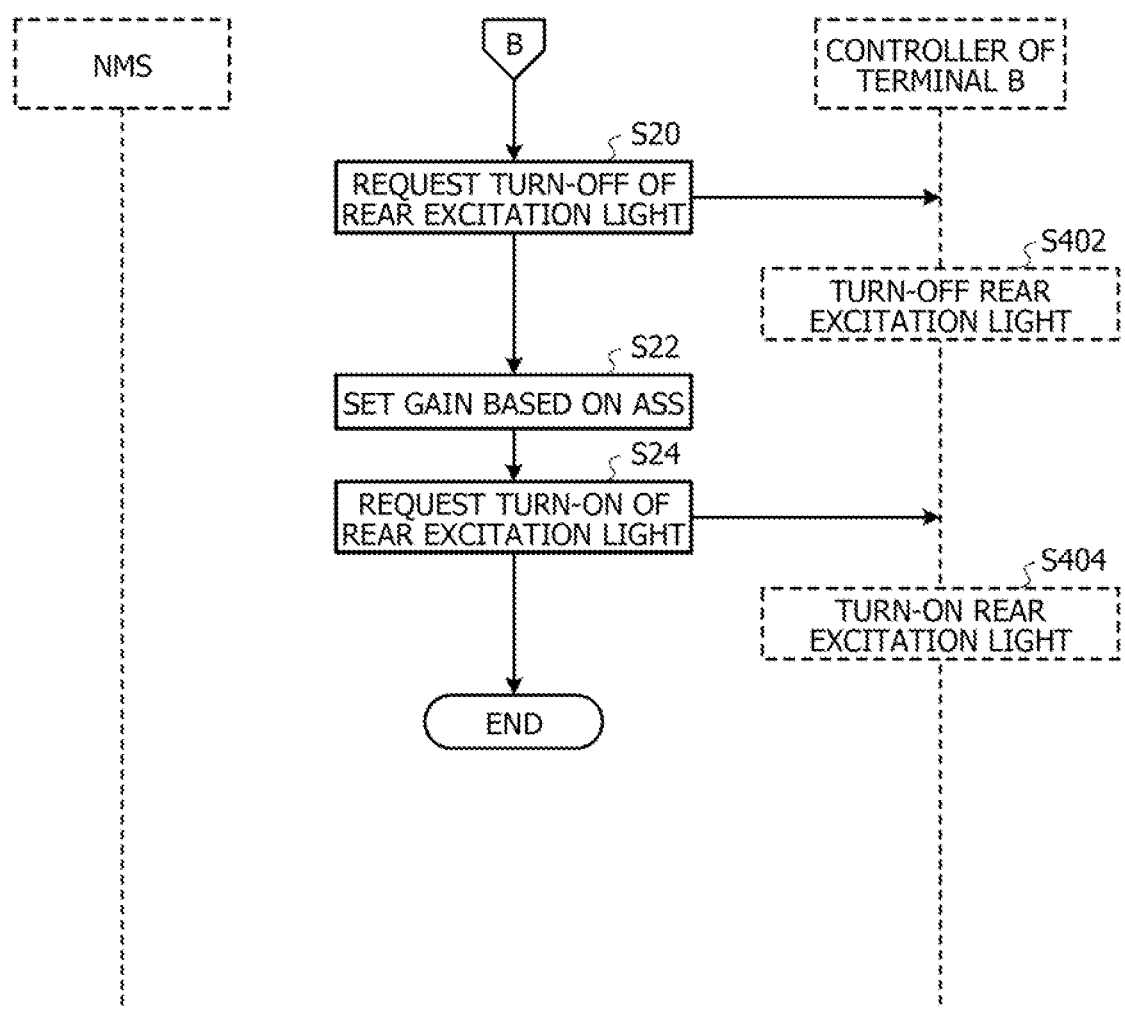
FIG. 17 is a flowchart illustrating an example of a process executed by the controller 2 for setting the gain of the front-exciting Raman amplifier 26.

FIGS. 15 to 17 are flowcharts illustrating an example of a process executed by the controller 2 for setting the gain of the front-exciting Raman amplifier 26. FIGS. 15 to 17 also illustrate processes executed by the NMS 40 and the controller 202 of the terminal B.

[Operation S2]

The CPU 54 (see, e.g., FIG. 5) of the controller 2 first requests that the NMS 40 transmit the operation information 90 (see, e.g., FIG. 4) of the WDM transmission system 4 via the FPGA 60a (operation S2). In response to this request, the NMS 40 transmits the operation information 90 to the controller 2 (operation S302). The CPU 54 acquires the transmitted operation information 90 via the FPGA 60a. The operation S2 and the acquisition of the operation information 90 are executed by the gain setting control unit 44.

[Operation S4]

The CPU 54 determines whether the acquired operation information 90 indicates that the WDM transmission system 4 is in operation (operation S4). The operation S4 is executed by the gain setting control unit 44 (see, e.g., FIG. 4).

[Operation S6]

When the operation information 90 does not indicate that the WDM transmission system 4 is in operation, the CPU 54 cooperates with the FPGA 60a and the like to set the Raman gain of the front-exciting Raman amplifier 26 based on the light intensity of the ASS 22 (see the following "(3-4-2) Gain Setting Based on Light Intensity of ASS 22"). The operation S6 is executed by the first gain setting unit 42a (see, e.g., FIG. 4).

[Operation S8]

When the operation information 90 indicates that the WDM transmission system 4 is in operation, the CPU 54 requests that the NMS 40 transmit the transmission information 92 (see, e.g., FIG. 4) via the FPGA 60a (operation S8). In response to this request, the NMS 40 transmits the transmission information 92 to the controller 2 (operation S304). The CPU 54 acquires the transmitted transmission information 92 via the FPGA 60a. The operation S8 and the acquisition of the transmission information 92 are executed by the gain setting control unit 44 (see, e.g., FIG. 4).

[Operation S10]

The CPU 54 determines whether the acquired transmission information 92 indicates transmission of the WDM signal 6 (operation S10). The operation S10 is executed by the gain setting control unit 44 (see, e.g., FIG. 4).

[Operation S12]

When the acquired transmission information 92 indicates the transmission of the WDM signal 6, the CPU 54 cooperates with the FPGA 60a and the like to set the Raman gain of the front-exciting Raman amplifier 26 based on the light intensity of the WDM signal 6 (see the following "(3-4-3) Gain Setting Based on Light Intensity of WDM signal 6"). The operation S12 is executed by the second gain setting unit 42b (see, e.g., FIG. 4).

[Operation S14]

When the acquired transmission information 92 does not indicate the transmission of the WDM signal 6, the CPU 54 requests that the NMS 40 transmit the excitation information 94 of the terminal B via the FPGA 60a (operation S14). In response to this request, the NMS 40 transmits the excitation information 94 to the controller 2 (operation S305). The CPU 54 acquires the transmitted excitation information 94 via the FPGA 60a. The operation S14 and the acquisition of the excitation information 94 is executed by the gain setting control unit 44 (see, e.g., FIG. 4).

The CPU 54 may acquire the excitation information 94 directly from the controller 202 of the terminal B via the OSC (i.e., the optical monitoring channel) and the FPGA 60a.

[Operation S16]

The CPU 54 determines whether the acquired excitation information 94 indicates that the excitation light 221 (see, e.g., FIG. 2) is being input to the other end E2 (i.e., the end face on the terminal B side) of the transmission fiber 10 (operation S16). The excitation light 221 (hereinafter, referred to as rear excitation light) is excitation light of the rear-exciting Raman amplifier 230 of the terminal B. The operation S16 is executed by the gain setting control unit 44 (see, e.g., FIG. 4).

[Operation S18]

When the excitation information 94 does not indicate that the excitation light 221 is being input, the CPU 54 cooperates with the FPGA 60a and the like to set the Raman gain of the front-exciting Raman amplifier 26 based on the light intensity of the ASS 22 (see the following "(3-4-2) Gain Setting Based on Light Intensity of ASS 22"). The operation S18 is executed by the first gain setting unit 42a (see, e.g., FIG. 4).

[Operation S20]

When the excitation information 94 indicates that the excitation light 221 is being input, the CPU 54 requests that the controller 202 turn off the rear excitation light 221 via the FPGA 60a and the OSC (in other words, the OSC transmitter 24 and the OSC receiver 232) (operation S20). In response to this request, the controller 202 of the terminal B causes the rear-exciting Raman amplifier 230 to turn off the excitation light 221 (operation S402). At this time, the controller 202 of the terminal B stores in the memory the Raman gain before turning off, which is set in the rear-exciting Raman amplifier 230.

The operation S20 is executed by the first excitation light adjustment unit 48a of the first gain setting unit 42a (see, e.g., FIG. 4).

[Operation S22]

After the operation S20, the CPU 54 cooperates with the FPGA 60a and the like to set the Raman gain of the front-exciting Raman amplifier 26 based on the light intensity of the ASS 22 (see the following "(3-4-2) Gain Setting Based on Light Intensity of ASS 22"). The operation S22 is executed by the first gain setting unit 42a (see, e.g., FIG. 4).

[Operation S24]

After the operation S22, the CPU 54 requests that the controller 202 of the terminal B turn on the rear excitation light 221 via the FPGA 60a and the OSC (in other words, the OSC transmitter 24 and the OSC receiver 232) (operation S24). In response to this request, the controller 202 of the terminal B causes the rear-exciting Raman amplifier 230 to turn on the rear excitation light 221 (operation S404). At this time, the controller 202 of the terminal B reads out the Raman gain (see the operation S402) stored in the memory before the excitation light is turned off, and sets the read Raman gain in the rear-exciting Raman amplifier 230.

The operation S24 is executed by the first excitation light adjustment unit 48a of the first gain setting unit 42a (see, e.g., FIG. 4).

(3-4-2) Gain Setting Based on Light Intensity of ASS 22

Figure 18:
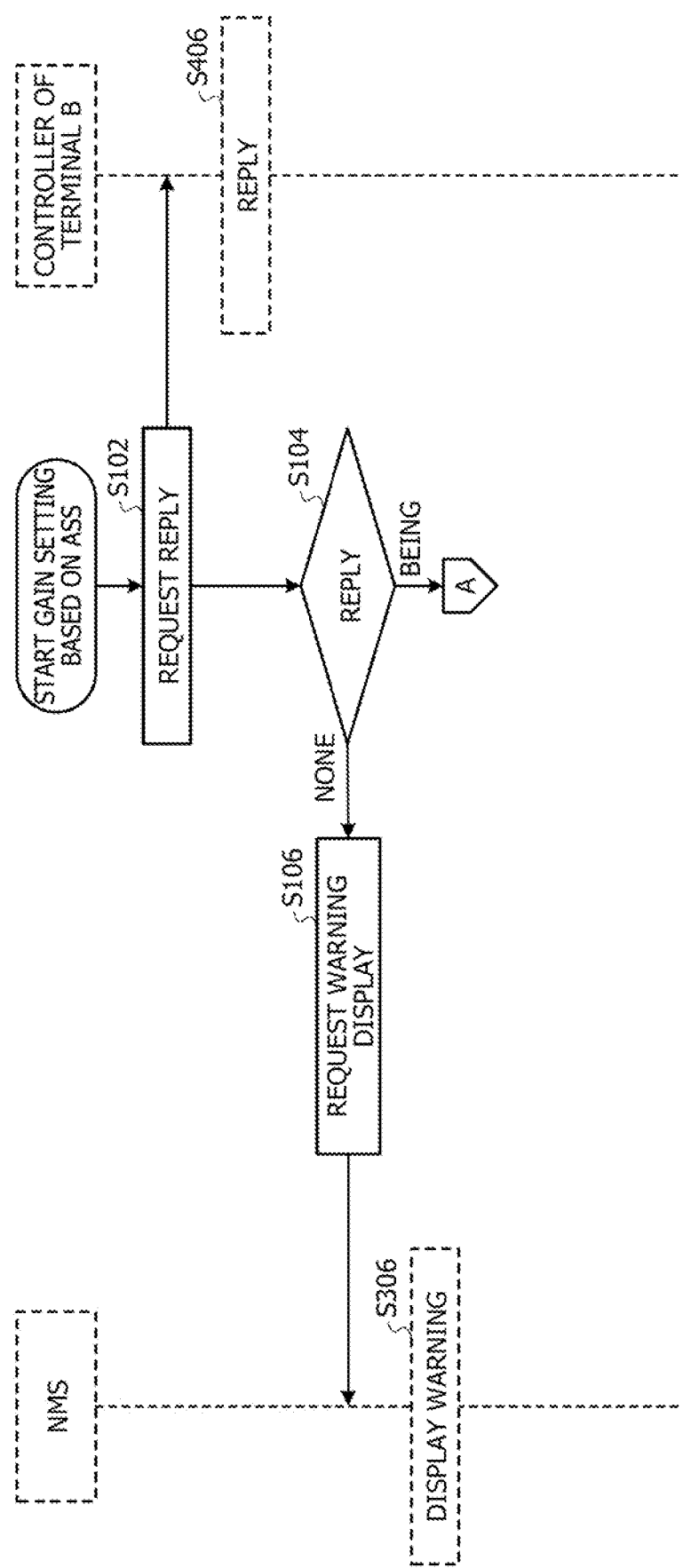
FIG. 18 is a flowchart illustrating an example of a process executed by the controller 2 for setting a gain based on the light intensity of an amplified spontaneous Raman scattering (ASS) 22.
Figure 19:
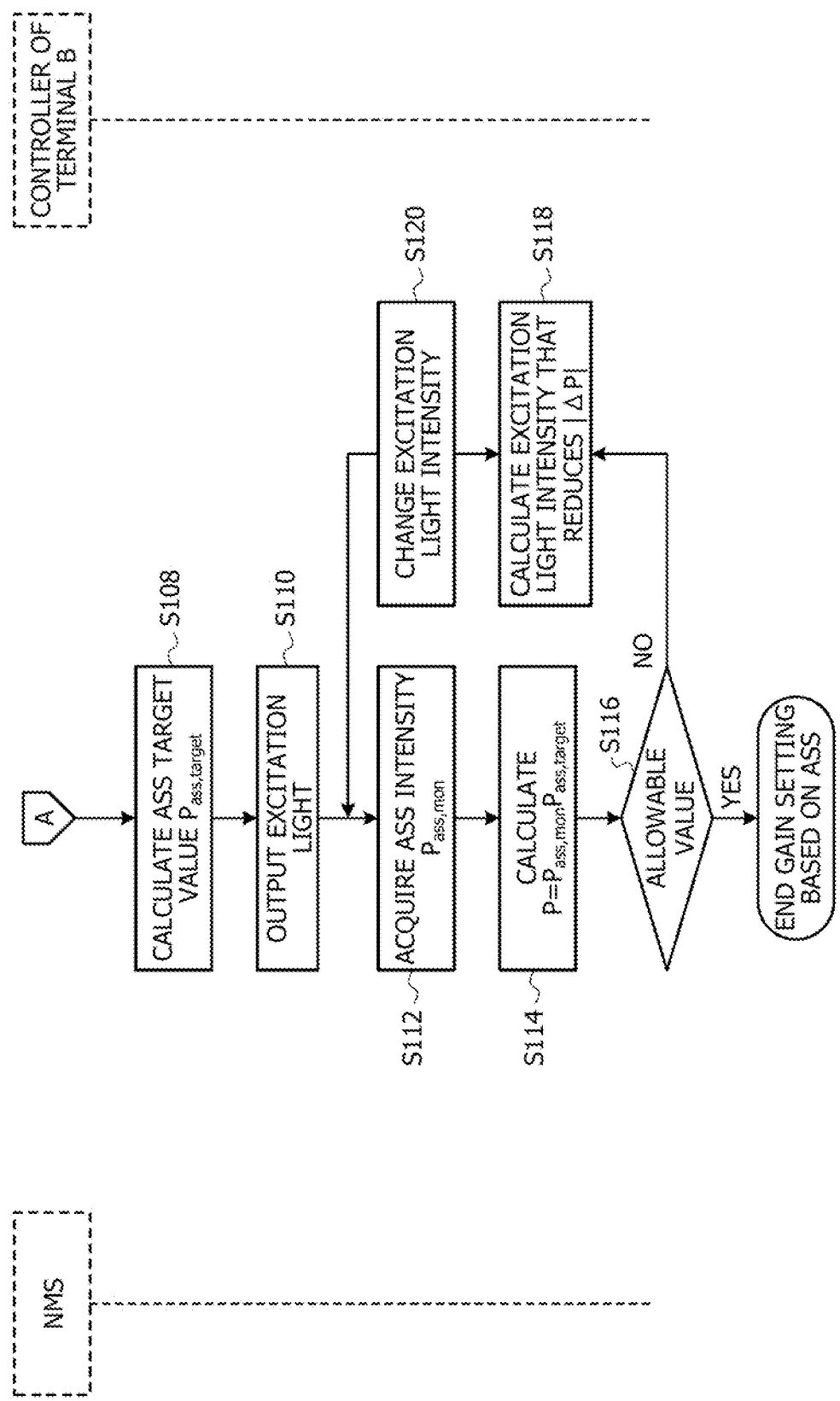
FIG. 19 is a flowchart illustrating an example of a process executed by the controller 2 for setting a gain based on the light intensity of the ASS 22.

FIGS. 18 and 19 are flowcharts illustrating an example of a process executed by the controller 2 for gain setting (operations S6, S18, and S22) based on the light intensity of the ASS 22. FIGS. 18 and 19 also illustrate processes executed by the NMS 40 and the controller 202 of the terminal B.

[Operation S102]

The CPU 54 (see, e.g., FIG. 5) requests that the controller 202 of the terminal B transmit a reply via the FPGA 60a and the OSC transmitter 24 (operation S102). The reply request is acquired by the controller 202 of the terminal B via the OSC receiver 232 of the terminal B.

In response to the reply request, the controller 202 of the terminal B transmits the reply to the controller 2 of the terminal A via the OSC transmitter 224 (operation S406). The CPU 54 acquires the transmitted reply via the OSC receiver 32 and the FPGA 60a.

The operation S102 and the acquisition of the reply are executed by the first excitation light adjustment unit 48a (see, e.g., FIG. 4).

[Operation S104]

The CPU 54 determines whether the reply has been acquired within a certain period of time (operation S104). The operation S104 is executed by the first excitation light adjustment unit 48a (see, e.g., FIG. 4).

[Operation S106]

When the reply is not acquired within the certain period of time, the CPU 54 requests that the NMS 40 warn that the transmission fiber 10 has not been connected, via the FPGA 60a (operation S106). The NMS 40 issues a warning in response to this warning request (operation S306).

Since the excitation lights 20 and 221 have high intensity (e.g., several hundred mW), when the transmission fiber 10 is not connected to the terminal A and the terminal B, human damage (e.g., a burn) due to the excitation lights 20 and 221 emitted from the transmission fiber 10 may occur. In order to reduce such human damage, the CPU 54 warns the NMS 40 that the transmission fiber 10 has not been connected.

The operation S106 is executed by the first excitation light adjustment unit 48a (see, e.g., FIG. 4).

[Operation S108]

When the reply is acquired within the certain period of time, the CPU 54 calculates the light intensity $P_{ass,target}$ of the ASS 22 when the Raman gain of the front-exciting Raman amplifier 26 matches the target value $G_{target}$ (operation S108).

Figure 20:
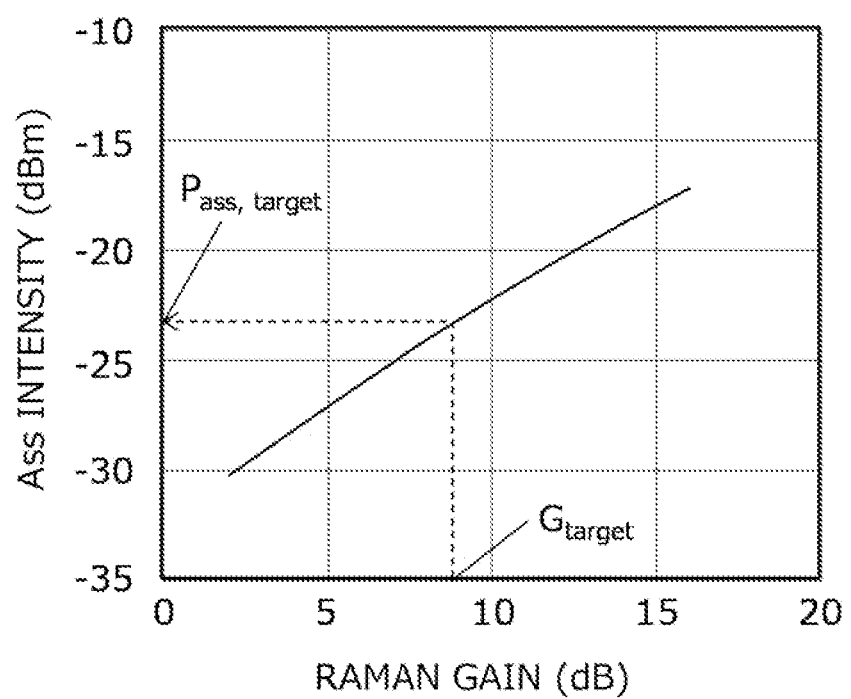
FIG. 20 is a diagram illustrating an example of the relationship between the intensity (i.e., optical power) of the ASS 22 and the Raman gain of the front-exciting Raman amplifier 26.

FIG. 20 is a diagram illustrating an example of the relationship between the intensity (i.e., the optical power) of the MS 22 and the Raman gain of the front-exciting Raman amplifier 26. The horizontal axis represents the Raman gain. The vertical axis is the light intensity of the ASS 22. As illustrated in FIG. 20, the light intensity of the ASS 22 and the Raman gain are substantially proportional. Therefore, the CPU 54 uses an approximate expression representing the relationship between the light intensity of the ASS 22 and the Raman gain to calculate the light intensity $P_{ass,target}$ (i.e., the ASS target value) of the ASS 22 when the Raman gain matches the target value $G_{target}$.

The relationship between the light intensity of the ASS 22 and the Raman gain is approximated by, for example, a quadratic function. The coefficient of this quadratic function is stored in, for example, the non-volatile memory 56. The CPU 54 reads this coefficient from the non-volatile memory 56 and calculates the ASS target values $P_{ass,target}$.

The operation S108 is executed by the ASS target value calculation unit 46 (see, e.g., FIG. 4).

[Operation S110]

After the operation S108, the CPU 54 causes the front-exciting Raman amplifier 26 to output the excitation light 20 via the FPGA 60a (operation S110). The light intensity (i.e., an initial value) of the excitation light 20 output at this time is stored in, for example, the non-volatile memory 56.

The operation S110 is executed by the first excitation light adjustment unit 48a (see, e.g., FIG. 4).

[Operation S112]

After the operation S110, the CPU 54 cooperates with the FPGA 60a, the TIA 62a, and the ADC 64a to calculate the light intensity $P_{ass,mon}$ (i.e., the ASS light intensity) of the ASS 22 from the signal 52 (see, e.g., FIG. 4) output by the scattered light monitor 18. The operation S112 is executed by the ASS light intensity acquisition unit 45.

[Operation S114]

After the operation S112, the CPU 54 calculates an error $\Delta P$ (= $P_{ass,mon} - P_{ass,target}$) between the ASS light intensity $P_{ass,mon}$ and the ASS target value $P_{ass,target}$. The operation S114 is executed by the first excitation light adjustment unit 48a (see, e.g., FIG. 4).

[Operation S116]

The CPU 54 determines whether the absolute value of the error $\Delta P$ calculated in the operation S114 is equal to or smaller than an allowable value (operation S116). When it is determined that the absolute value of the error $\Delta P$ is equal to or smaller than the allowable value, the gain setting based on the ASS light intensity is ended.

The operation S116 is executed by the first excitation light adjustment unit 48a (see, e.g., FIG. 4).

[Operation S118]

When it is determined that the absolute value of the error ΔP calculated in the operation S116 is larger than the allowable value, the CPU 54 calculates the light intensity (i.e., the excitation light intensity) of the excitation light 20 that reduces the absolute value of the error ΔP (operation S118). For example, when the error ΔP is negative (−), the CPU 54 calculates an excitation light intensity larger than the current excitation light intensity. When the error ΔP is positive (+), the CPU 54 calculates an excitation light intensity smaller than the current excitation light intensity. The "current excitation light intensity" is an excitation light intensity obtained when the operation S112 is finally executed.

The operation S118 is executed by the first excitation light adjustment unit 48a (see, e.g., FIG. 4).

[Operation S120]

After the operation S118, the CPU 54 sets the excitation light intensity calculated in the operation S118 in the excitation light source 27 (see, e.g., FIG. 1) of the front-exciting Raman amplifier 26 via the FPGA 60a. As a result, the light intensity of the excitation light 20 is changed to the excitation light intensity calculated in the operation S118. The operation S118 is executed by the first excitation light adjustment unit 48a (see, e.g., FIG. 4).

After the operation S120, the CPU 54 returns to the operation S112.

By repeating the operations S102 to S120, the Raman gain of the front-exciting Raman amplifier 26 is finally set to substantially the target value $G_{target}$.

(3-4-3) Gain Setting Based on Light Intensity of WDM Signal 6

Figure 21:
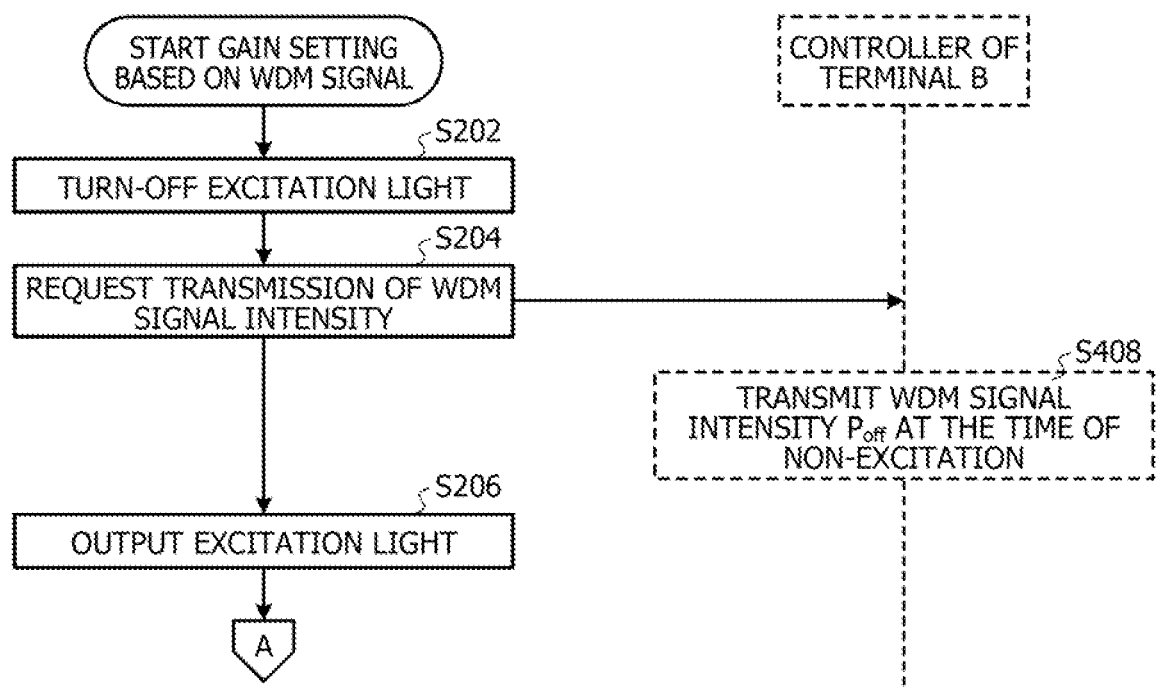
FIG. 21 is a flowchart illustrating an example of a process executed by the controller 2 for setting a gain based on the light intensity of a WDM signal 6.
Figure 22:
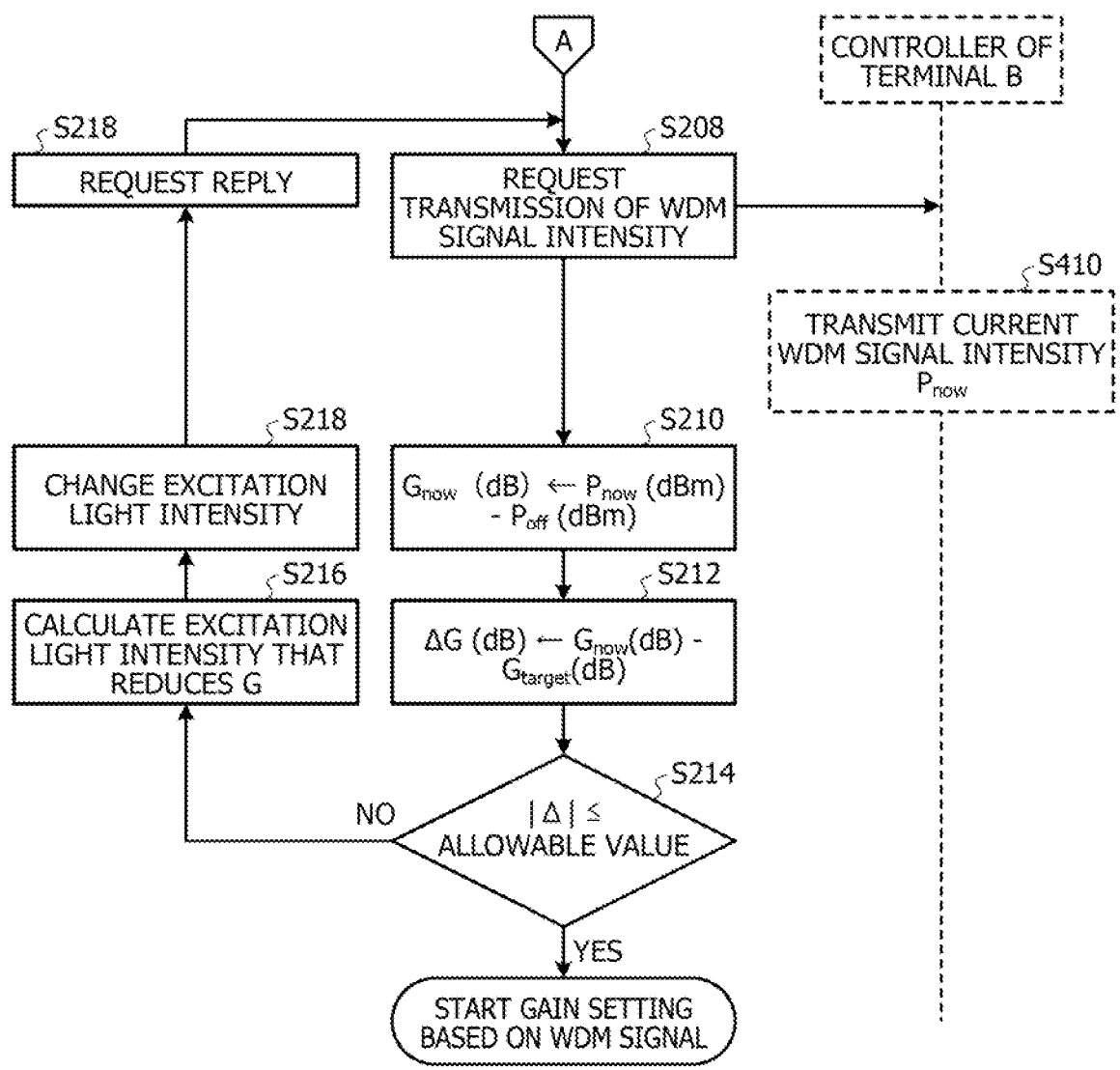
FIG. 22 is a flowchart illustrating an example of a process executed by the controller 2 for setting a gain based on the light intensity of the WDM signal 6.

FIGS. 21 and 22 are flowcharts illustrating an example of a process executed by the controller 2 for gain setting (the operation S12) based on the light intensity of the WDM signal 6. FIGS. 21 and 22 also illustrate a process executed by the controller 202 of the terminal B.

[Operation S202]

The CPU 54 sets the output of the excitation light source 27 (see, e.g., FIGS. 1 and 11) that outputs the excitation light 20, to 0 watt via the FPGA 60a (operation S202). The operation S202 is executed by the second excitation light adjustment unit 48b (see, e.g., FIG. 4).

[Operation S204]

The CPU 54 (see, e.g., FIG. 5) transmits, to the controller 202 of the terminal B via the FPGA 60a and the OSC transmitter 24 (see, e.g., FIG. 1), a request 96 for transmitting light intensity information 98 (see, e.g., FIG. 4) indicating the light intensity of the WDM signal 6 (operation S204).

In response to the request 96, the controller 202 of the terminal B first acquires the light intensity $P_{off}$ of the WDM signal 6 output from the transmission fiber 10 (see "(3-3) Second Gain Setting Unit 42b"). The controller 202 of the terminal B further transmits the light intensity information 98 indicating the acquired light intensity $P_{off}$ to the controller 2 of the terminal A via the OSC transmitter 224 (operation S408). The CPU 54 acquires the transmitted light intensity information 98 via the OSC receiver 32 and the FPGA 60a.

The operation S204 is executed by the Raman gain calculation unit 50 (see, e.g., FIG. 4).

[Operation S206]

After the operation S204, the CPU 54 causes the front-exciting Raman amplifier 26 to output the excitation light 20 via the FPGA 60a (operation S206). The light intensity (e.g., an initial value) of the excitation light 20 output at this time is stored in, for example, the non-volatile memory 56.

The operation S206 is executed by the second excitation light adjustment unit 48b (see, e.g., FIG. 4).

[Operation S208]

The CPU 54 (see, e.g., FIG. 5) transmits again, to the controller 202 of the terminal B via the FPGA 60a and the OSC transmitter 24 (see, e.g., FIG. 1), the request 96 (see, e.g., FIG. 4) for transmitting the light intensity information 98 (see, e.g., FIG. 4) indicating the light intensity of the WDM signal 6 (operation S208).

In response to the request 96, first, the controller 202 of the terminal B acquires again the light intensity $P_{now}$ of the WDM signal 6 output from the transmission fiber 10. The controller 202 of the terminal B further transmits the light intensity information 98 indicating the reacquired light intensity (hereinafter, referred to as the current light intensity) $P_{now}$ to the controller 2 of the terminal A via the OSC transmitter 224 (operation S410).

The operation S208 is executed by the Raman gain calculation unit 50 (see, e.g., FIG. 4).

[Operation S210]

After the operation S208, the CPU 54 calculates the intensity ratio $G_{now}$ ($=P_{now}/P_{off}$) between the current light intensity $P_{now}$ and the light intensity $P_{off}$ acquired in the operation S204. The intensity ratio $G_{now}$ (hereinafter, referred to as the current intensity ratio) indicates the latest Raman gain of the front-exciting Raman amplifier 26. In many cases, the light intensity of the WDM signal 6 is constant over time. In such cases, the intensity ratio $G_{now}$ indicates the Raman gain of the front-exciting Raman amplifier 26.

The operation S210 is executed by the Raman gain calculation unit 50 (see, e.g., FIG. 4).

[Operation S212]

After the operation S210, the CPU 54 calculates an error ΔG ($=G_{now}-G_{target}$) between the current intensity ratio $G_{now}$ and the target value $G_{target}$ of the Raman gain.

The operation S212 is executed by the Raman gain calculation unit 50 (see, e.g., FIG. 4).

[Operation S214]

The CPU 54 determines whether the absolute value of the error ΔG calculated in the operation S212 is equal to or smaller than an allowable value (operation S214). When it is determined that the absolute value of the error ΔG is equal to or smaller than the allowable value, the gain setting based on the light intensity of the WDM signal 6 is ended.

The operation S214 is executed by the second excitation light adjustment unit 48b (see, e.g., FIG. 4).

[Operation S216]

When it is determined that the absolute value of the error ΔG calculated in the operation S214 is larger than the allowable value, the CPU 54 calculates the excitation light intensity of the excitation light 20 that reduces the absolute value of the error ΔG (operation S216). For example, when the error ΔG is negative (−), the CPU 54 calculates an excitation light intensity larger than the current excitation light intensity (an excitation light intensity at the latest execution of the operation S208). Meanwhile, when the error ΔG is positive (+), the CPU 54 calculates an excitation light intensity smaller than the current excitation light intensity.

The operation S216 is executed by the second excitation light adjustment unit 48b (see, e.g., FIG. 4).

[Operation S218]

After the operation S216, the CPU 54 sets the excitation light intensity calculated in the operation S216 in the excitation light source 27 (see, e.g., FIG. 1) via the FPGA 60a. As a result, the light intensity of the excitation light 20 is changed to the excitation light intensity calculated in the operation S216. The operation S218 is executed by the second excitation light adjustment unit 48b (see, e.g., FIG. 4).

After the operation S218, the CPU 54 returns to the operation S208.

By repeating the operations S202 to S218, the Raman gain of the front-exciting Raman amplifier 26 is set to substantially the target value $G_{target}$.

Although detailed description is omitted, the Raman gain of the rear-exciting Raman amplifier 30 is set by the controller 2 in substantially the same procedure as the "gain setting based on the light intensity of the ASS 22" illustrated in, for example, FIGS. 18 and 19.

(4) Usage Example

The controller 2 according to the first embodiment is used, for example, when adding a high bit rate optical transceiver (i.e., an optical transmitter/receiver) to an already installed optical transmission system.

For example, it is assumed that a system excluding an n-th optical transmitter Txλn, an n-th optical receiver Rxλn, and the front-exciting Raman amplifier 26 from the WDM transmission system 4 of FIG. 1 has already been installed. The controller 2 according to the first embodiment is used when adding the optical transmitter/receiver Txλn/Rxλn having a bit rate higher than the already installed optical transmitters/receivers Txλ1 to Txλn−1/Rxλ1 to Rxλn−1 to such a system.

The high bit rate (e.g., 800 Gbps to 1.6 Tbps) optical transmitter Txλn is susceptible to noise. Therefore, in order to improve the OSNR of the WDM signal 6, the front-exciting Raman amplifier 26 is installed together with the optical transmitter/receiver Txλn/Rxλn. The installation of the front-exciting Raman amplifier 26 is implemented, for example, by connecting the excitation light source 27 to the already installed optical filter 80c (see, e.g., FIG. 11) with an optical connector. The Raman gain of the installed front-exciting Raman amplifier 26 is set by the controller 2 according to the first embodiment.

According to the controller 2, the Raman gain of the front-exciting Raman amplifier 26 may be set regardless of whether the WDM signal 6 is being communicated. Therefore, according to the controller 2, the Raman gain of the front-exciting Raman amplifier 26 may be set without stopping the operation of the WDM transmission system in which the front-exciting Raman amplifier 26 is installed.

The bit rates of the already installed optical transmitters Txλ1 to Txλn−1 are, for example, 200 Gbps to 400 Gbps. The bit rate of the added optical transmitter Txλn is, for example, 800 Gbps to 1.6 Tbps.

In the above example, the front-exciting Raman amplifier 26 is installed in the already installed WDM transmission system 4. However, the front-exciting Raman amplifier 26 may be installed when the WDM transmission system 4 is constructed. In such a case, the controller 2 may set the Raman gain of the front-exciting Raman amplifier 26 based on the light intensity of the ASS 22 before starting the operation of the WDM transmission system 4 (see the operations S2 to S6 in FIG. 15).

(5) Modifications

In the above example, the Raman gain based on the light intensity of the ASS 22 is set after the rear excitation light 221 is turned off when the rear excitation light 221 is input to the transmission fiber 10 (see the operations S20 to S22 in FIG. 17). However, according to a modification, the Raman gain based on the light intensity of the ASS 22 may be set even when the rear excitation light 221 is not turned off.

In the modification, first, the light intensity (hereinafter, referred to as background light intensity $P_{back}$) of scattered light of the ASS of the rear excitation light 221, which reaches the terminal A, is calculated from a signal (e.g., the photocurrent) output by the scattered light monitor 18 when the excitation light 20 is not output from the front-exciting Raman amplifier 26.

The controller 2 further calculates the light intensity $P_{ass,mon}$ of the ASS 22 from the output of the scattered light monitor 18 when the excitation light 20 is being output from the front-exciting Raman amplifier 26. The controller 2 further controls the front-exciting Raman amplifier 26 so that the light intensity $P_{ass,mon}$ calculated from the output of the scattered light monitor 18 matches the sum of the ASS target value $P_{ass,target}$ and the background light intensity $P_{back}$.

That is, in the operation S114 of FIG. 19, the sum of the target value $P_{ass,target}$ and the background light intensity $P_{back}$ is used instead of the target value $P_{ass,target}$. The operations S20, S24, S402, and S404 of FIG. 17 are not executed. Instead of operation S20, the background light intensity $P_{back}$ is measured.

According to the modification, since the rear excitation light 221 is not turned off at the terminal B, the procedure for setting the Raman gain in the front-exciting Raman amplifier 26 may be simplified.

(6) Control Method of Front-Exciting Raman Amplifier

For example, when the WDM signal 6 is not being communicated via the transmission fiber 10, the controller 2 first calculates the Raman gain of the front-exciting Raman amplifier 26 based on the scattered light intensity of the amplified spontaneous scattered light 22 of the excitation light 20 (see the operation S112 in FIG. 19). For example, the controller 2 further controls the front-exciting Raman amplifier 26 so that the calculated Raman gain matches the target value of the Raman gain (see the operations S114 to S120 in FIG. 19).

Meanwhile, when the WDM signal 6 is in communication, for example, the controller 2 calculates the Raman gain based on the light intensity of the WDM signal 6 output from the transmission fiber 10 (see the operation S202 in FIG. 21 to the operation S210 in FIG. 22). For example, the controller 2 further controls the Raman amplifier 26 so that the calculated Raman gain matches the target value of the Raman gain of the front-exciting Raman amplifier 26 (the operations S212 to S218 in FIG. 22). The front-exciting Raman amplifier 26 may be controlled by a device (e.g., a personal computer) other than the controller 2 (see, e.g., FIG. 1).

In the example described with reference to FIG. 5 and the like, the controller 2 includes the CPU 54, the memories 56 and 58, and the FPGA 60a. However, the controller 2 may not include the CPU 54 and the memories 56 and 58. In this case, the gain setting control unit 44, the first gain setting unit 42a, and the second gain setting unit 42b are implemented by the FPGA 60a.

The controller 2 may not include the FPGA 60a. In this case, the gain setting control unit 44, the first gain setting unit 42a, and the second gain setting unit 42b may be implemented by, for example, the CPU 54, the memories 56 and 58, and an interface circuit.

The controller 2 may be a large scale integration (LSI) system. In this case, the gain setting control unit 44, the first gain setting unit 42a, and the second gain setting unit 42b are implemented by the LSI system.

In the example described with reference to FIGS. 1 to 4, the controller 2 does not include the scattered light monitor 18, the WDM signal monitor 34, the OSC transmitter 24, and the OSC receiver 32. However, the controller 2 may have one or more of the scattered light monitor 18, the WDM signal monitor 34, the OSC transmitter 24, and the OSC receiver 32.

In the first embodiment, in non-communication where the WDM signal 6 does not exist, the Raman gain is set based on the ASS 22 instead of the WDM signal 6. Further, in the first embodiment, in communication of the WDM signal where it is difficult to monitor the ASS 22 due to the reflected light of the WDM signal or the like, the Raman gain is set based on the WDM signal 6 instead of the ASS 22. Therefore, according to the first embodiment, the gain of the front-exciting Raman amplifier 26 may be set regardless of whether the WDM signal 6 is in communication via the transmission fiber 10.

Second Embodiment

A second embodiment is similar to the first embodiment. Therefore, the description of the same configurations and the like as those of the first embodiment will be omitted or simplified.

The communication-related information 53 (see, e.g., FIG. 4) of the first embodiment includes the operation information 90. Meanwhile, the communication-related information 53 of the second embodiment does not include the operation information 90. That is, a controller of the second embodiment executes a process excluding the operations S2 to S6 from the process (see, e.g., FIGS. 15 to 17) executed by the controller 2 of the first embodiment. Except for the above points, the controller and control method according to the second embodiment are substantially the same as the controller and control method according to the first embodiment.

Even when the communication-related information 53 does not include the operation information 90, it is possible to determine whether the WDM signal 6 is in communication, based on the transmission information 92. Therefore, according to the second embodiment, as in the first embodiment, the Raman gain may be set in the front-exciting Raman amplifier 26 regardless of whether the WDM signal 6 is in communication.

Further, in the second embodiment, since a process based on the operation information 90 (e.g., the operations S2 to S6 in FIG. 15) is not performed, the process of the controller 2 may be simplified.

Although the embodiments of the present disclosure have been described above, the first and second embodiments are examples and are not restrictive.

For example, in the first and second embodiments, the connection between the transmission fiber 10 and the terminals A and B is checked by the controller 2 before actuating the front-exciting Raman amplifier 26 (the operations S102 to S106 in FIG. 18). However, the controller 2 may bot check the connection of the transmission fiber 10. In this case, preferably, the connection of the transmission fiber 10 is artificially checked.

In the first and second embodiments, the optical signals output from the optical transmitter Tx are WDM signals 6 having different wavelengths. However, the optical signals output from the optical transmitter Tx may be an optical signal having a single wavelength.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A controller for a front-exciting Raman amplifier that amplifies an optical signal transmitted from one end of an optical fiber to an other end of the optical fiber by inputting an excitation light for Raman amplification to the one end of the optical fiber so that the excitation light travels from the one end of the optical fiber toward the other end of the optical fiber, the controller comprising:
a memory; and
a processor coupled to the memory and configured to:
acquire communication-related information regarding communication of the optical signal in the optical fiber,
when the acquired communication-related information does not indicate the communication of the optical signal,
set a Raman gain of the front-exciting Raman amplifier based on a first light intensity of an amplified spontaneous scattered light of the excitation light so that the Raman gain becomes a non-zero target value, and
when the acquired communication-related information indicates the communication of the optical signal,
set the Raman gain based on a second light intensity of the optical signal output from the optical fiber so that the Raman gain becomes the target value.

2. The controller according to claim 1,
wherein the processor is configured to:
when setting the Raman gain based on the first light intensity,
calculate the first light intensity when the Raman gain based on the first light intensity matches the target value, and
set the Raman gain based on the first light intensity by adjusting a third light intensity of the excitation light so that the first light intensity becomes the calculated first light intensity, and
when setting the Raman gain based on the second light intensity,
set the Raman gain based on the second light intensity by adjusting the third light intensity so that the Raman gain calculated based on the second light intensity becomes the target value.

3. The controller according to claim 1,
wherein the processor is configured to:
acquire operation information that indicates whether a transmission system that includes the optical fiber and the front-exciting Raman amplifier is in operation,
acquire transmission information that indicates whether the optical signal is being transmitted when the operation information indicates that the transmission system is in operation, when setting the Raman gain based on the first light intensity,
set the Raman gain based on the first light intensity when the operation information does not indicate that the transmission system is in operation, and when the operation information indicates that the transmission system is in operation and the transmission information does not indicate that the optical signal is being transmitted, and
when setting the Raman gain based on the second light intensity,
set the Raman gain based on the second light intensity when the operation information indicates that the transmission system is in operation and the transmission information indicates that the optical signal is being transmitted, and
wherein the operation information and the transmission information are included in the communication-related information.

4. The controller according to claim 3,
wherein the transmission system further includes a rear-exciting Raman amplifier that amplifies the optical signal by inputting another excitation light to the other end of the optical fiber, and
wherein the processor is configured to:
when setting the Raman gain based on the first light intensity,
acquire excitation information that indicates whether the another excitation light is being input to the other end of the optical fiber when the operation information indicates that the transmission system is in operation and the transmission information does not indicate that the optical signal is being transmitted, and
interrupt an input of the another excitation light to the rear-exciting Raman amplifier before setting the Raman gain based on the first light intensity when the excitation information indicates that the another excitation light is being input.

5. The controller according to claim 2
wherein the processor is configured to:
when setting the Raman gain based on the first light intensity,
acquire the first light intensity from a signal output by a scattered light monitor, and
adjust the third light intensity so that the acquired first light intensity becomes the calculated intensity, and
wherein the scattered light monitor outputs the signal according to the first light intensity.

6. The controller according to claim 2,
wherein the processor is configured to:
when setting the Raman gain based on the second light intensity,
calculate the Raman gain based on the second light intensity, based on light intensity information that indicates the second light intensity, and
adjust the third light intensity so that the calculated Raman gain based on the second light intensity becomes the target value.

7. A controller for a front-exciting Raman amplifier that amplifies an optical signal transmitted from one end of an optical fiber to an other end of the optical fiber by inputting an excitation light for Raman amplification to the one end of the optical fiber so that the excitation light travels from the one end of the optical fiber toward the other end of the optical fiber, the controller comprising:
a memory; and
a processor coupled to the memory and configured to:
when the optical signal is not being transmitted,
calculate a Raman gain of the front-exciting Raman amplifier based on a first light intensity of amplified spontaneous scattered light of the excitation light, and
control the front-exciting Raman amplifier so that the calculated Raman gain matches a non-zero target value of the Raman gain, and
when the optical signal is being transmitted,
calculate the Raman gain based on a second light intensity of the optical signal output from the optical fiber, and
control the front-exciting Raman amplifier so that the calculated Raman gain matches the target value.

8. A control method to control a front-exciting Raman amplifier that amplifies an optical signal transmitted from one end of an optical fiber to an other end of the optical fiber by inputting an excitation light for Raman amplification to the one end of the optical fiber so that the excitation light travels from the one end of the optical fiber toward the other end of the optical fiber, the control method comprising:
when the optical signal is not being transmitted,
calculating a Raman gain of the front-exciting Raman amplifier based on a first light intensity of amplified spontaneous scattered light of the excitation light, and
controlling the front-exciting Raman amplifier so that the calculated Raman gain matches a non-zero target value of the Raman gain, by a processor, and
when the optical signal is being transmitted,
calculating the Raman gain based on a second light intensity of the optical signal output from the optical fiber, and
controlling the front-exciting Raman amplifier so that the calculated Raman gain matches the target value, by the processor.

* * * * *